(12) United States Patent
Nagata et al.

(10) Patent No.: US 7,529,161 B2
(45) Date of Patent: May 5, 2009

(54) INFORMATION REPRODUCTION DEVICE AND INFORMATION REPRODUCTION METHOD FOR REPRODUCING INFORMATION BY SWITCHING TO SERVO POLARITY CORRESPONDING TO LAND TRACK AND GROOVE TRACK AND INFORMATION RECORDING METHOD FOR RECORDING INFORMATION BY SWITCHING TO SERVO POLARITY CORRESPONDING TO LAND TRACK AND GROOVE TRACT

(75) Inventors: Kazuhiro Nagata, Yokohama (JP); Minoru Yonezawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 709 days.

(21) Appl. No.: 11/043,052

(22) Filed: Jan. 27, 2005

(65) Prior Publication Data
US 2005/0169136 A1 Aug. 4, 2005

(30) Foreign Application Priority Data
Jan. 29, 2004 (JP) ............................. 2004-021651

(51) Int. Cl.
G11B 7/00 (2006.01)
(52) U.S. Cl. .............................. 369/44.28; 369/44.29
(58) Field of Classification Search ........................ None
See application file for complete search history.

(56) References Cited

U.S. PATENT DOCUMENTS

| 5,712,835 | A  | * | 1/1998 | Akiyama | 369/30.37 |
| 5,872,767 | A  | * | 2/1999 | Nagai et al. | 369/275.3 |
| 7,206,263 | B2 | * | 4/2007 | Buchler et al. | 369/44.28 |
| 2005/0169130 | A1 | * | 8/2005 | Lo | 369/44.29 |

FOREIGN PATENT DOCUMENTS

JP 10-283738 10/1998

* cited by examiner

*Primary Examiner*—Joseph Feild
*Assistant Examiner*—Joseph Haley
(74) *Attorney, Agent, or Firm*—Pillsbury Winthrop Shaw Pittman, LLP

(57) ABSTRACT

An information reproduction method according to an aspect of this invention is directed to an information reproduction method which reproduces information from an information storage medium on which land and groove tracks which can record information are alternately formed in the radial direction along wobbles that represent address information, comprising determining a track structure of a current position traced by a light beam on the basis of the address information, and a track structure of a target position on the basis of a target position address, controlling access to the address of the target position by switching between a first servo polarity corresponding to a land track and a second servo polarity corresponding to a groove track at a predetermined timing as needed on the basis of the determination result of the two track structures, and reproducing predetermined information from the target position address.

8 Claims, 20 Drawing Sheets

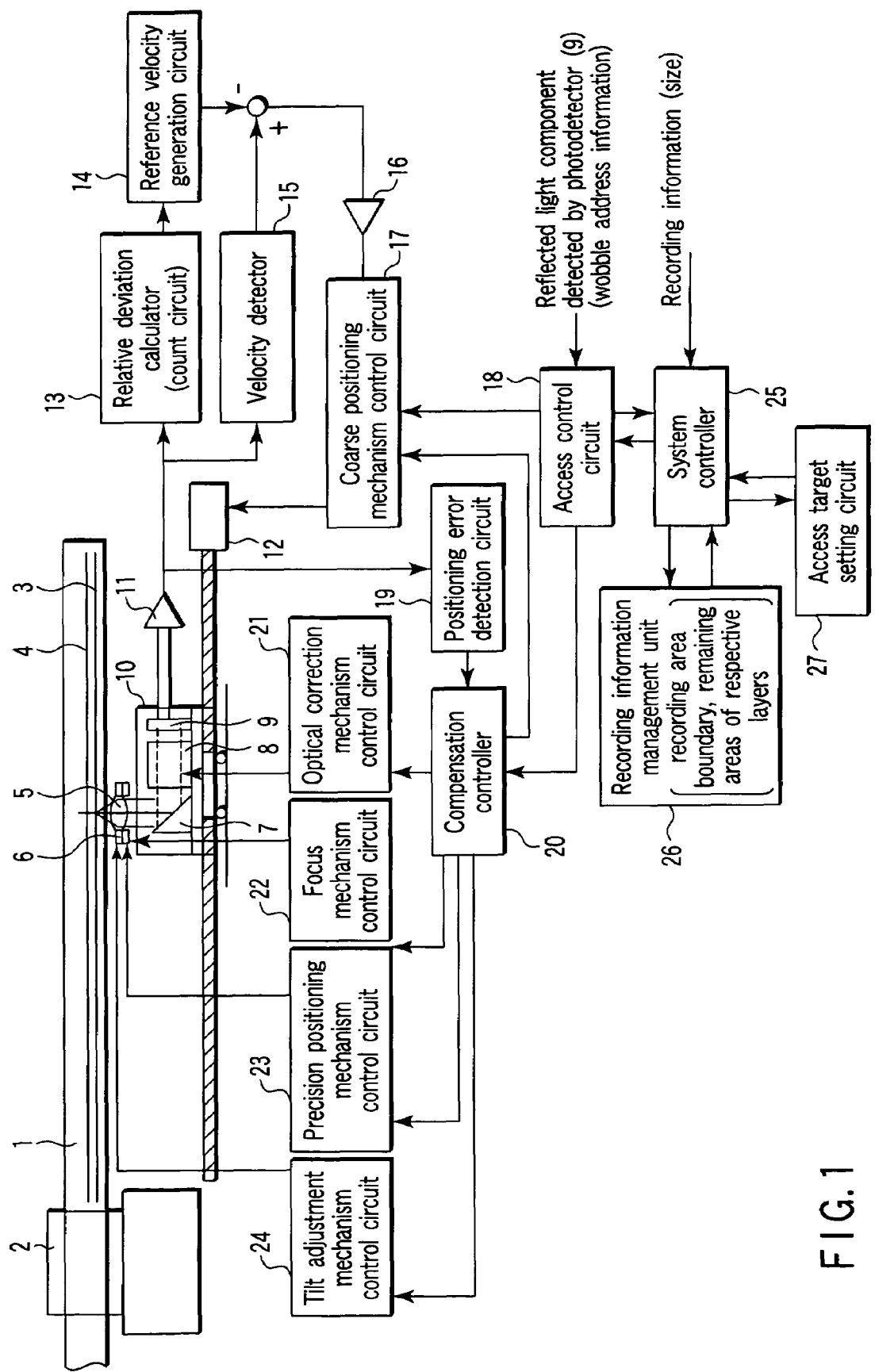
F I G. 1

| Decimal value | Conventional binary notation | Gray code notation |
|---|---|---|
| 0 | 0000 | 0000 |
| 1 | 0001 | 0001 |
| 2 | 0010 | 0011 |
| 3 | 0011 | 0010 |
| 4 | 0100 | 0110 |
| 5 | 0101 | 0111 |
| 6 | 0110 | 0101 |
| 7 | 0111 | 0100 |
| 8 | 1000 | 1100 |
| 9 | 1001 | 1101 |
| 10 | 1010 | 1111 |
| 11 | 1011 | 1110 |
| 12 | 1100 | 1010 |
| 13 | 1101 | 1011 |
| 14 | 1110 | 1001 |
| 15 | 1111 | 1000 |

FIG. 11

| SYNC | IPW | NPW | IPW | NPW |
|---|---|---|---|---|
| | 6 wobbles | 4 wobbles | 6 wobbles | 68 wobbles |

| Address | IPW | bit 2 | bit 1 | bit 0 | NPW |
|---|---|---|---|---|---|
| | 4 wobbles | 4 wobbles | 4 wobbles | 4 wobbles | 68 wobbles |

| Unity | NPW |
|---|---|
| | 84 wobbles |

FIG. 19

| NPW | SCM 1 | NPW | SCM 2 | NPW | NPW |
|---|---|---|---|---|---|
| 2 wobbles | 2 wobbles | 8 wobbles | 2 wobbles | 2 wobbles | 68 wobbles |

FIG. 20

| NPW | SCM 1 | NPW | SCM 2 | NPW | NPW |
|---|---|---|---|---|---|
| 2 wobbles | 2 wobbles | 4 wobbles | 2 wobbles | 6 wobbles | 68 wobbles |

FIG. 21

| Recording cluster | | ~540 |
|---|---|---|
| Data segment × n | Extended guard field | ~528 |
| 77496 × n | 24 | |

FIG. 23

| Groove track | G-S 1101 | L-S 11X1 | G-S 1101 | L-S 11X1 | |
| Land track | | L-S 1101 | | L-S 1100 | |
| Groove track | G-S 1100 | L-S X100 | G-S 1100 | L-S X100 | |
| Land track | | L-S 0101 | | L-S 0100 | |
| Groove track | G-S 0101 | L-S 010X | G-S 0100 | L-S 010X | |

| Groove/land track | Track number | Track number determination criteria |
|---|---|---|
| Groove : G(n+2) | 1101X | Groove=only first 4 bits are effective |
| Odd land : L(n+1) | 110X0 | Either of 11010 or 11000 is present only on this odd land |
| Groove : G(n+1) | 1100X | Groove=only first 4 bits are effective |
| Even land : L(n) | X1001 | Either of 11001 or 01001 is present only on this even land |
| Groove : G(n) | 0100X | Groove=only first 4 bits are effective |

F I G. 27

| Land/groove identification | Track number | Track number information A606 | Track number information B607 |
|---|---|---|---|
| Groove | 2n+3 | 2n+4 | 2n+3 |
| Land | 2n+3 | Indefinite (2n+2 or 2n+3) | 2n+3 |
| Groove | 2n+2 | 2n+2 | 2n+3 |
| Land | 2n+2 | 2n+2 | Indefinite (2n+1 or 2n+3) |
| Groove | 2n+1 | 2n+2 | 2n+1 |
| Land | 2n+1 | Indefinite (2n or 2n+2) | 2n+1 |
| Groove | 2n | 2n | 2n+1 |
F I G. 29
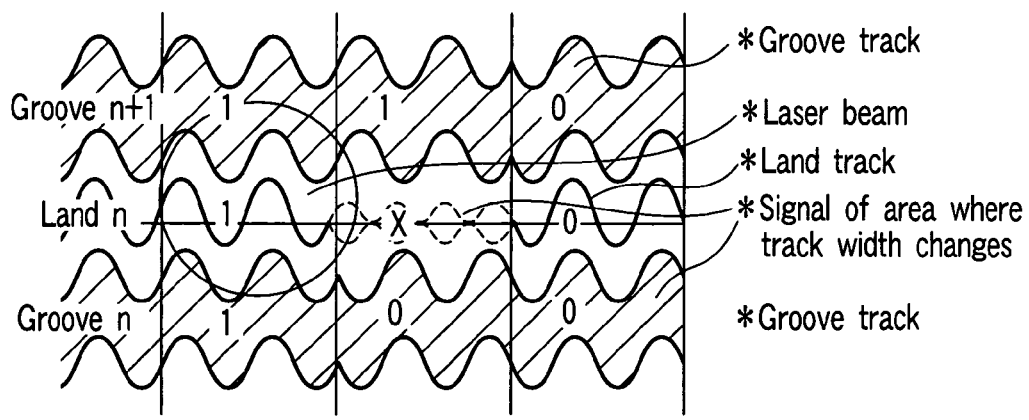
F I G. 30

| Track structure | Detected track number |
|---|---|
| Groove | n+3 |
| Even land (n+2) | (n+2) or (n+3) |
| Groove | n+2 |
| Even land (n+1) | (n+1) or (n+2) |
| Groove | n+1 |
| Even land (n) | (n) or (n+1) |
| Groove | n |

FIG. 31

| Groove/land track | Track number | Track number determination criteria |
|---|---|---|
| Groove : G(n+2) | 1101 | |
| Odd land : L(n+1) | 110* | Either of 1101 or 1100 is present only on this odd land |
| Groove : G(n+1) | 1100 | |
| Even land : L(n) | *100 | Either of 1100 or 0100 is present only on this even land |
| Groove : G(n) | 0100 | |

FIG. 32

INFORMATION REPRODUCTION DEVICE AND INFORMATION REPRODUCTION METHOD FOR REPRODUCING INFORMATION BY SWITCHING TO SERVO POLARITY CORRESPONDING TO LAND TRACK AND GROOVE TRACK AND INFORMATION RECORDING METHOD FOR RECORDING INFORMATION BY SWITCHING TO SERVO POLARITY CORRESPONDING TO LAND TRACK AND GROOVE TRACT

CROSS-REFERENCE TO RELATED APPLICATIONS

This application is based upon and claims the benefit of priority from prior Japanese Patent Application No. 2004-021651, filed Jan. 29, 2004, the entire contents of which are incorporated herein by reference.

BACKGROUND OF THE INVENTION

1. Field of the Invention

The present invention relates to an information storage medium on which land tracks and groove tracks are alternately formed every round. The present invention also relates to an information reproduction method for reproducing information from such an information storage medium. Furthermore, the present invention relates to an information recording method for recording information on such an information storage medium.

2. Description of the Related Art

As is well known, in recent years, single-sided/single-layered optical disks having a capacity of 4.7 GB have been put into practical use. For example, rewritable DVD+RW, DVD-RW, and DVD-RAM disks are known. An information recording layer is formed on a transparent substrate of each of these optical disks, and land tracks and groove tracks are alternately formed every round on this information recording layer. Information is recorded on/reproduced from an optical disk along these tracks. That is, by focusing a laser beam on these tracks, information is recorded on these tracks and information recorded on these tracks is reproduced.

Of the aforementioned optical disks, a DVD-RAM records a physical address used to specify a spatial position where information is to be recorded/reproduced. For example, this physical address is formed to interrupt tracks, and is called a complementary allocated pit address (CAPA). A track jump action is allowed within a region where this CAPA is recorded.

In contrast, on a DVD+RW, a physical address is reflected on each groove track by utilizing groove wobble modulation (to be referred to as wobble modulation hereinafter) that slightly wobbles each groove track in the radial direction. This method changes the phase of wobbles in correspondence with information (physical address) to be recorded, as disclosed in Jpn. Pat. Appln. KOKAI Publication No. 10-283738. The physical address recorded by such wobble modulation does not interrupt the recording tracks. That is, the physical address recorded by the wobble modulation does not squeeze the recording area of user information on the disk. For this reason, high format efficiency and high compatibility with read-only media can be assured.

On the aforementioned optical disk having tracks with the land & groove structure, the depth from the disk surface to the land track is different from that to the groove track. Hence, the servo polarity for the land track and that for the groove track must be switched.

Since the servo polarities must be switched, access to a target address by a jump may often become inefficient.

BRIEF SUMMARY OF THE INVENTION

An information reproduction method, information recording method, and information storage medium according to the present invention have the following arrangements.

An information reproduction method according to one aspect of the present invention is directed to an information reproduction method which reproduces information from an information storage medium on which land and groove tracks which can record information are alternately formed in a radial direction along wobbles that reflect address information, comprising: determining a track structure of a current position traced by a light beam on the basis of the address information reflected on reflected light obtained from the information storage medium, and a track structure of a target position on the basis of a target position address included in a seek command; controlling access to the address of the target position by switching between a first servo polarity corresponding to a land track and a second servo polarity corresponding to a groove track at a predetermined timing as needed on the basis of a determination result of the two track structures; and reproducing predetermined information reflected on the reflected light obtained from an area corresponding to the address of the target position.

An information recording method according to one aspect of the present invention is directed to an information recording method which records information on an information storage medium on which land and groove tracks which can record information are alternately formed in a radial direction along wobbles that reflect address information, comprising: determining a track structure of a current position traced by a light beam on the basis of the address information reflected on reflected light obtained from the information storage medium, and a track structure of a target position on the basis of a target position address included in a seek command; controlling access to the address of the target position by switching between a first servo polarity corresponding to a land track and a second servo polarity corresponding to a groove track at a predetermined timing as needed on the basis of a determination result of the two track structures; and recording predetermined information on an area corresponding to the address of the target position.

An information storage medium according to one aspect of the present invention is directed to an information storage medium comprising: land and groove tracks which are tracks formed along wobbles and are alternately formed every rounds, the wobbles including a modulated field on which address information is reflected, and a non-modulated fields which follows the modulated field, and the address information allowing the land and groove tracks to be determined.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below serve to explain the principles of the invention.

FIG. 1 is a block diagram showing an example of a control system of an information recording/reproduction apparatus according to the present invention;

FIG. 11 shows an example of Gray codes used to reduce the frequency of occurrence of an indefinite bit;

FIG. 19 shows an example of the WDU in a unity field;

FIG. 20 shows an example of the WDU of an outer mark;

FIG. 21 shows an example of the WDU of an inner mark;

FIG. 23 shows an example of the layout of a recording cluster;

FIG. 27 shows an example of odd/even detection of land tracks formed by changing the groove width;

FIG. 29 shows an example of a track number information setting method of a rewritable information storage medium;

FIG. 30 shows an example of wobble detection on land tracks;

FIG. 31 shows the relationship of address detection values on land tracks in groove wobbling; and FIG. 32 shows the relationship of the track numbers based on groove wobbling and detection data on land tracks.

DETAILED DESCRIPTION OF THE INVENTION

The preferred embodiments of the present invention will be described hereinafter with reference to the accompanying drawings.

Figure 2:
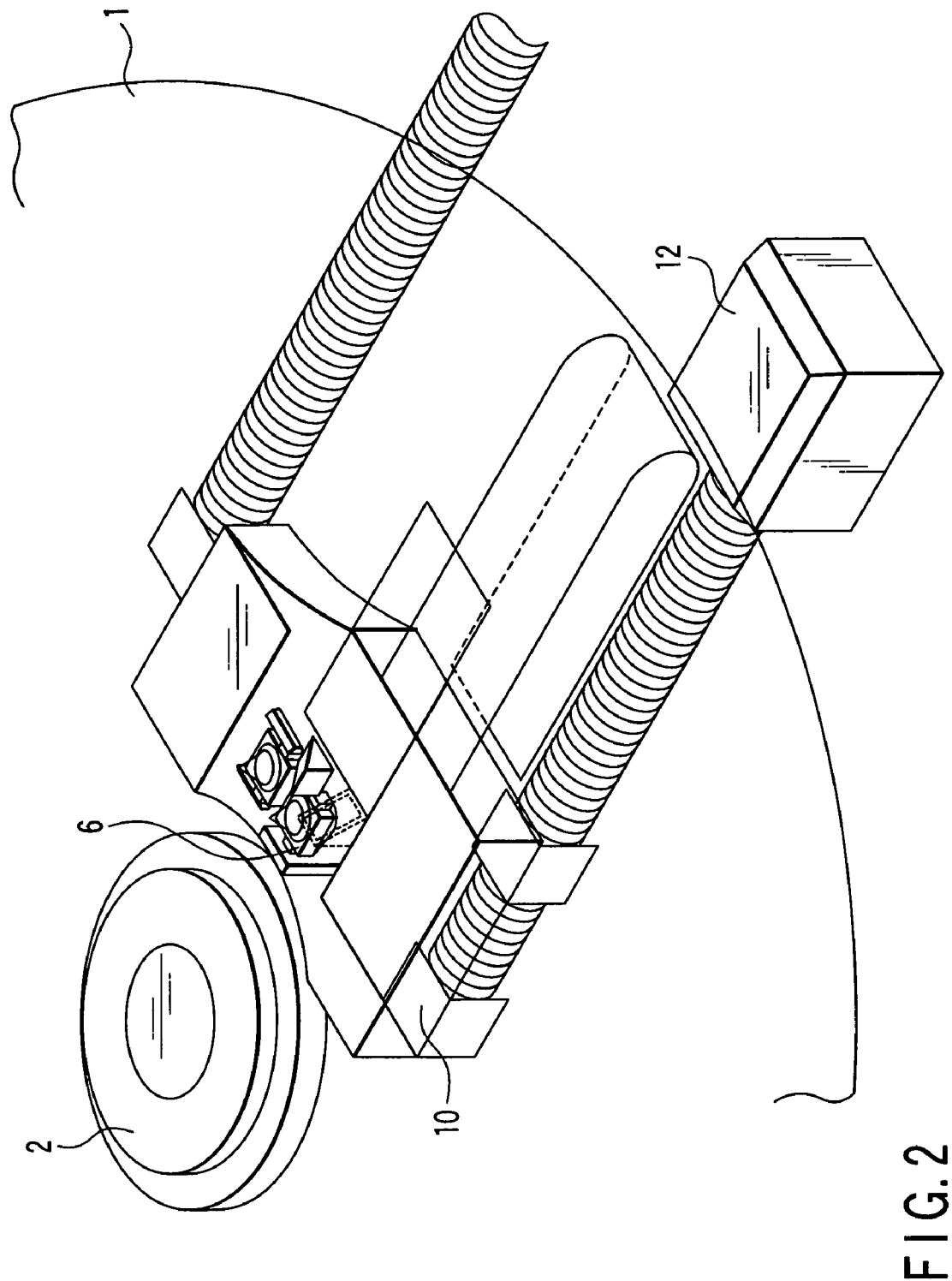
FIG. 2 is a view showing an example of an optical head carriage mechanism of the information recording/reproduction apparatus according to the present invention.
Figure 3:
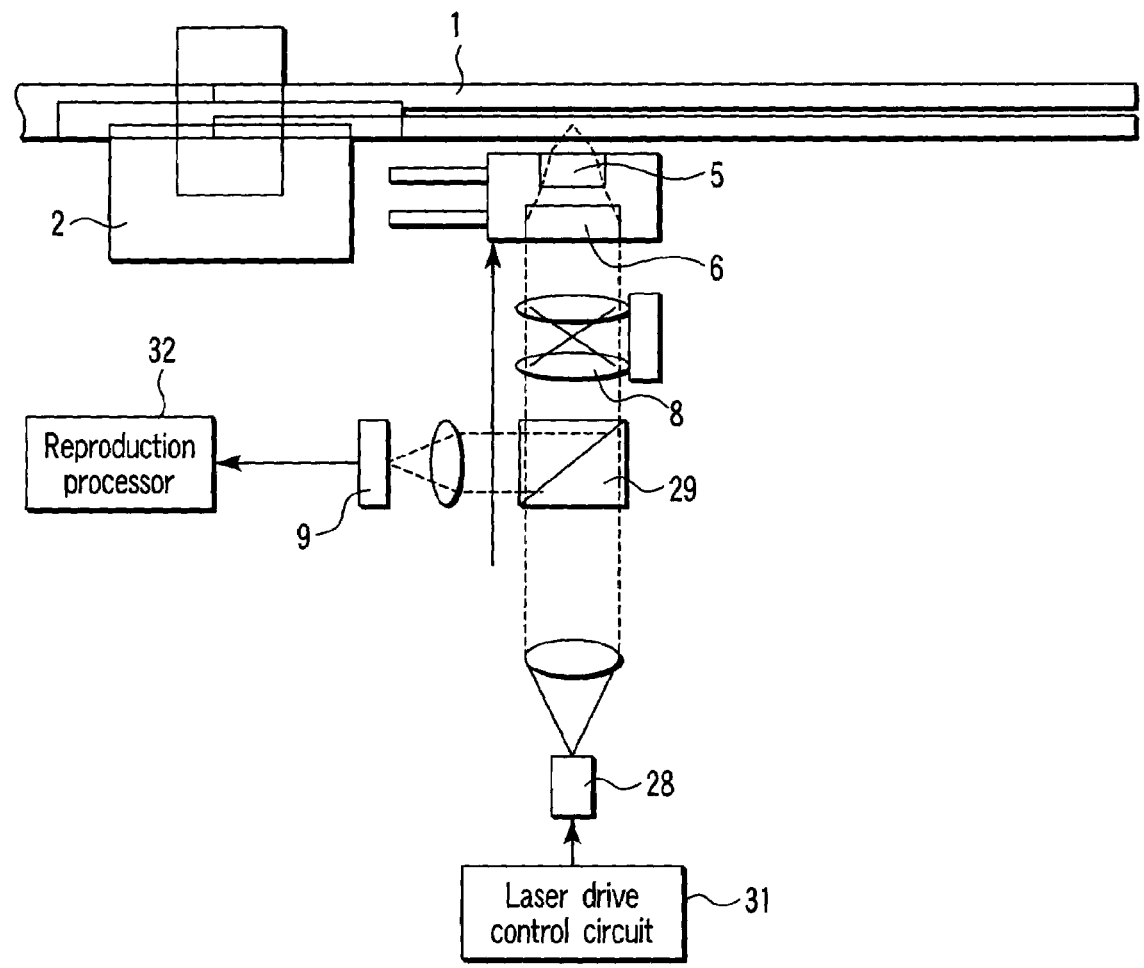
FIG. 3 is a view showing an example of an optical system of the information recording/reproduction apparatus according to the present invention.

FIGS. 1 to 3 show a schematic arrangement of an information recording/reproduction apparatus according to an embodiment of the present invention. FIG. 1 shows an example of a control system of the information recording/reproduction apparatus, FIG. 2 shows an example of an optical head carriage mechanism of the information recording/reproduction apparatus, and FIG. 3 shows an example of an optical system of the information recording/reproduction apparatus.

This information recording/reproduction apparatus records information on an optical disk 1 as an information storage medium and reproduces information from the optical disk 1. The optical disk 1 is a rewritable medium having a phase change recording layer as an information recording layer, i.e., a medium which has first and second recording layers 3 and 4, which undergoes information recording/reproduction by means of an optical beam focused by an objective lens 5. The optical disk 1 is rotated and controlled by a spindle motor 2.

An optical head 10 as recording means/reproduction means irradiates a predetermined information recording layer with a predetermined laser beam under the control of a laser drive control circuit 31, thus recording information (forming marks) at a predetermined position on the optical disk 1. This recording is attained by mark length recording that provides information at the edge of a recorded mark. A laser beam output from a laser beam source 28 provided to the optical head 10 is converted into collimated light by a collimator lens 30, is transmitted through a half prism 29, and enters an optical correction mechanism 8 via an optical element (not shown). This optical correction mechanism 8 comprises a relay lens and liquid crystal element. The optical correction mechanism 8 corrects aberrations so that a beam spot is formed on the information recording layer to have sufficiently small spherical aberration. The light beam corrected by this optical correction mechanism 8 enters the objective lens 5 via a mirror 7, and forms a beam spot on the predetermined recording surface of the optical disk 1.

In contrast, light reflected by the information recording surface is reflected again by the mirror 7, and some light components enter a photodetector 9 via the half prism 29. The photodetector 9 has a plurality of divided detection cells, and information reflected in reflected light components detected by these detection cells is reproduced by a reproduction processing unit 32. On the basis of the reflected light components detected by these detection cells, position errors of a beam spot focused on the information recording surface from a target position are detected. The position errors include a focus position error required to be detected to form a just-focus beam spot on the information recording surface, a track position error, tilt error, and spherical aberration error. Information tracks used to record/reproduce information are formed on the information recording surface, and a position error in the disk radial direction from a target track is the track position error. The tilt error is a deviation angle between the optical axis of a light beam emanating from the objective lens 5 and the normal to the optical disk 1. If this angle is large, a coma is produced in a beam spot, thus degrading the spot quality. Finally, the spherical aberration similarly deteriorates the spot quality, and is produced when the wavefront focused by the objective lens 5 deviates from a spherical surface.

In the information recording/reproduction apparatus, various position errors described above are detected by a positioning error detection circuit 19 using the photodetector 10 and a difference circuit 11. That is, the positioning error detection circuit 19 detects various position errors on the basis of reflected light components from the disk detected by the photodetector 10. A compensation controller 20 calculates control manipulation amounts corresponding to the spherical aberration error, focus position error, track position error, and tilt error on the basis of various position errors so as to form an appropriate beam spot at a target position on the disk. Then, the controller 20 inputs the control manipulation amounts corresponding to the spherical aberration error, focus position error, track position error, and tilt error on the basis of various position errors to an optical correction mechanism control circuit 21, focus mechanism control circuit 22, fine positioning mechanism control circuit 23 and coarse positioning mechanism control circuit 17, and tilt adjustment mechanism control circuit 24, respectively.

The optical correction mechanism control circuit 21 controls driving of the optical correction mechanism 8 so that a beam spot is appropriately formed at the target position. Likewise, the focus mechanism control circuit 22 controls driving of an objective lens positioning mechanism 6 so that a beam spot is appropriately formed at the target position. Also, the coarse positioning mechanism control circuit 17 controls driving of the objective lens positioning mechanism 6 so that a beam spot is appropriately formed at the target position. Furthermore, the fine positioning mechanism control circuit 23 controls driving of the objective lens positioning mechanism 6 so that a beam spot is appropriately formed at the target position. Again, the tilt adjustment mechanism control circuit 24 controls driving of the objective lens positioning mechanism 6 so that a beam spot is appropriately formed at the target position. As described above, a beam spot is formed at the target position to record an information sequence. If a system controller 25 receives a recording request of a new information sequence, an information recording/reproduction means makes new access.

Movement of a beam spot in one information recording layer, i.e., movement to the target position, will be explained below. For example, access from an arbitrary current position to the target position (reproduction or recording start position) will be explained. For example, in an information reproduction mode, the system controller 25 receives a reproduction start instruction of a given title or chapter. A recorded information management unit 26 manages information (titles and chapters) recorded on the optical disk, and retrieves a title or chapter corresponding to the input reproduction instruction. In response to this, an access target setting circuit 27 calculates an address required to access the retrieved title or chapter. That is, the access target setting circuit 27 calculates the address of the target position. The system controller 25 outputs a seek command to the address of the target position. An access control circuit 18 temporarily opens track positioning control accordingly, and outputs an access control signal required to control access to the address of the target position. In an information recording mode, the system controller 25 receives recording information. The recorded information management unit 26 determines a recording destination of the recording information on the basis of a free area in the information recording area, and the access target setting circuit 27 calculates an address corresponding to this recording destination. That is, the circuit 27 calculates the address of the target position. The system controller 25 outputs a seek command to the address of the target position. The access control circuit 18 temporarily opens track positioning control accordingly, and outputs an access control signal required to control access to the address of the target position.

The coarse positioning mechanism control circuit 17 controls a coarse positioning mechanism 12 on the basis of the access control circuit from the access control circuit 18. Also, the fine positioning mechanism control circuit 23 controls the objective lens positioning mechanism 6 on the basis of the access control circuit from the access control circuit 18. Under these control operations, a beam spot begins to move in the radial direction of the optical disk. Upon movement of this beam spot, a track position error (tracking error) is generated, and access is controlled using a track position error signal corresponding to this error.

A relative deviation calculator 13 detects the number of information tracks across which the beam spot has moved by access by binarizing the track position error signals and counting the binary signals. The access control circuit 18 calculates in advance the number of tracks to be moved as a difference between an information track at the current position (an information track traced by the optical beam before the beginning of access) and that at the target position. That is, the number of passed tracks is subtracted from the number of tracks to be moved to calculate the number of remaining tracks to the information track at the target position. The access control circuit 18 controls a reference velocity generation circuit 14, in which a target moving velocity with respect to the number of remaining tracks calculated in this way is prescribed as a reference value, to generate a target velocity. On the other hand, by dividing the spacing between neighboring information tracks by the time interval of leading pulses of the binarized track position error signal, the moving velocity at the time of passage of each track can be detected. This moving velocity detection is done by a velocity detector 15. The target velocity and detected velocity are compared by a comparison circuit so that the detected velocity follows the target velocity, and the difference value is amplified by an amplifier circuit 16 and is input to the coarse positioning mechanism control circuit 17. Furthermore, depending on the positional relationship between the target track and beam spot, the difference value is input to the fine positioning mechanism control circuit 23 via the access control circuit 18 to drive the objective lens positioning mechanism 6. When the beam spot reaches a position immediately before the target track, the access control circuit 18 closes the track position error control system again. Then, the circuit 18 calculates a control manipulation amount required to drive the objective lens positioning mechanism 6 to remove the track position errors using the compensation controller 20, and supplies it to the fine positioning mechanism control circuit 23. After that, the address of the actually reached target track is read by a signal processing system of the system. If this address is substantially equal to that of the target information track, the access ends.

An overview of the optical disk 1 (recordable information storage medium) will be described below with reference to FIGS. 8 to 32.

[1] Common Technical Features in Embodiment of Rewritable Information Storage Medium

[1-1] Zone Structure

Figure 8:
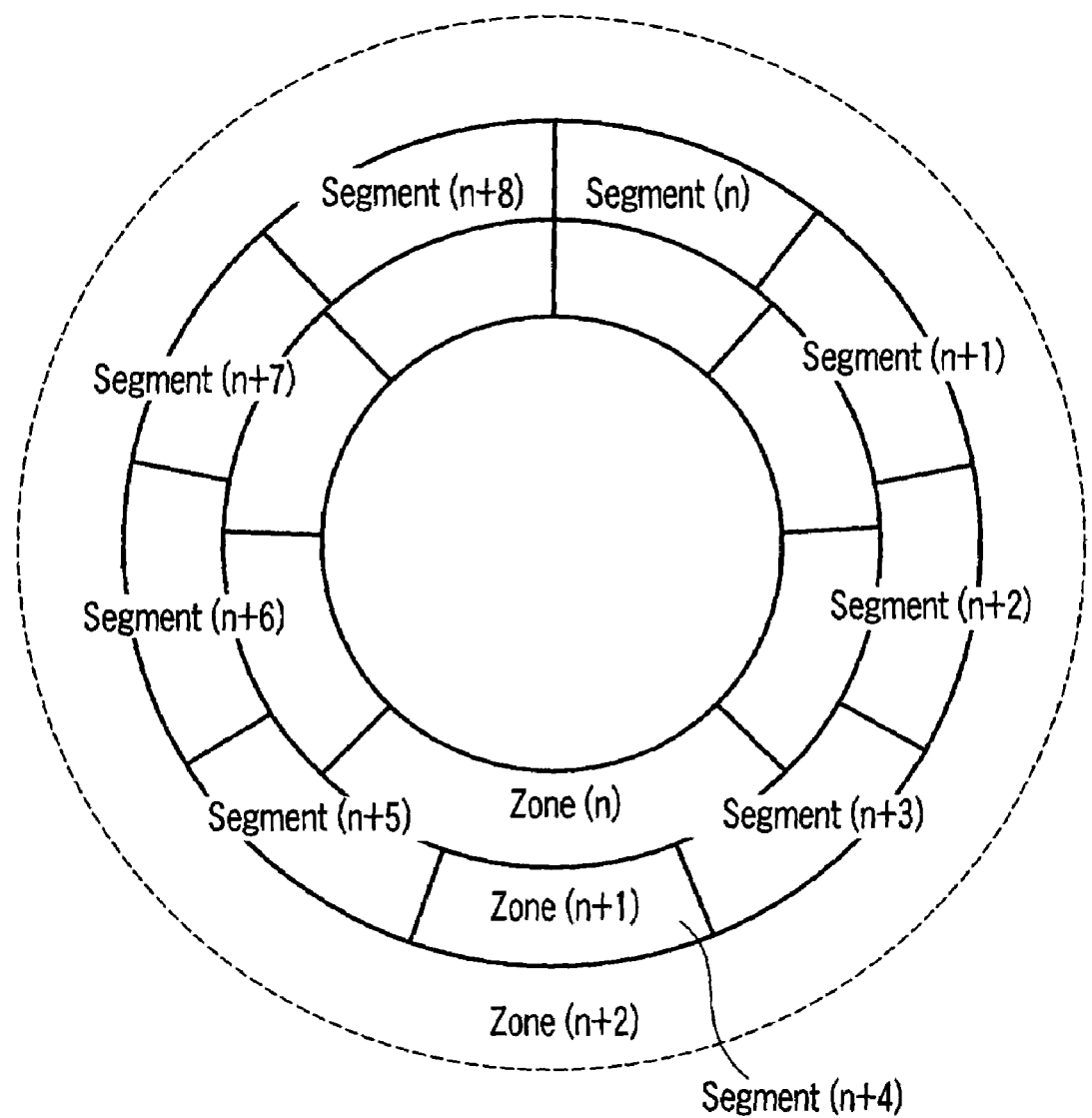
FIG. 8 shows an example of the zone structure of a rewritable information storage medium.

The rewritable information storage medium of this embodiment adopts the zone structure, as shown in FIG. 8.

The zone structure of this embodiment has the following specifications.

Reproduction linear velocity: 5.6 to 6.0 m/s
(6.0 m/s in a system lead-in area)
Channel length: 0.087 to 0.093 μm
(0.204 μm in the system lead-in area)
Track pitch: 0.34 μm
(0.68 μm in the system lead-in area)
Channel frequency: 64.8 MHz
(32.4 MHz in the system lead-in area)
Recording data (RF signal): (1, 10)RLL
Wobble carrier frequency: about 700 kHz (937/wobble)
Modulation phase difference [deg]: ±900.0
Number of zones: 19 zones

[1-2] Recording Format of Address Information (Wobble Modulation Based on Phase Modulation+NRZ)

In this embodiment, address information on the recordable information storage medium is recorded in advance using wobble modulation. As wobble modulation, ±90° (180°) phase modulation is used, and non-return to zero (NRZ) is adopted. On the other hand, land/groove recording is used for a rewritable information storage medium. This embodiment is characterized in that wobble modulation is adopted in land/groove recording.

Note that land/groove recording is a method of recording information on both land and groove tracks. As the track structure of the rewritable information storage medium, a structure in which information recordable land tracks and information recordable groove tracks are alternately formed in the radial direction in a double-spiral pattern, or a structure in which information recordable land tracks and information recordable groove tracks are alternately formed toward the radial direction in a single-spiral pattern may be used. In the double-spiral pattern, two spirals are overlaid, one spiral corresponds to a land track, and the other spiral corresponds to a groove track. In the single-spiral pattern, land and groove tracks are switched every rounds in a single spiral.

A practical explanation will be given using FIG. 9. In this embodiment, a 1-address bit (also referred to as an address symbol) area 511 is expressed by 8 or 12 wobbles, and the frequencies, amplitudes, and phases remain constant throughout the 1-address bit area 511. When identical values run as address bit values, the same phase continues at a boundary (indicated by a black triangle in FIG. 9). On the other hand, when the address bit is inverted, a wobble pattern is inverted (180° phase shift).

[Individual Point in Embodiment and Unique Effect of Individual Point]

Figure 9:
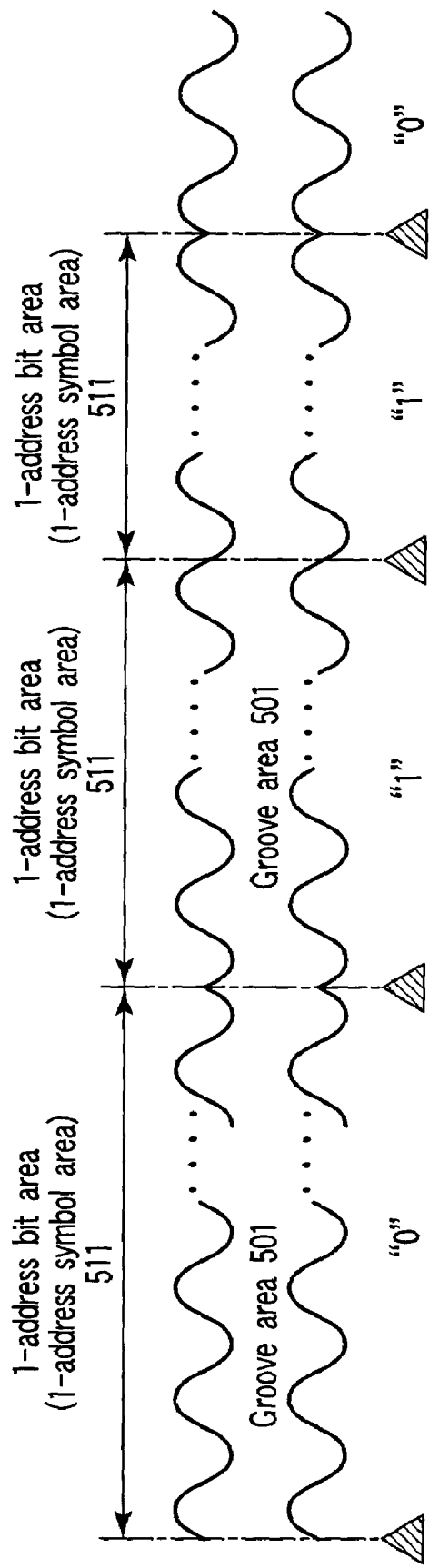
FIG. 9 is a view for explaining an example of wobble modulation.

Land/groove recording adopts 180° (±90°) wobble phase modulation (FIG. 9).

[Effect]

When an indefinite bit is generated on a land due to a change in track number of a groove in land/groove recording+ wobble modulation of a groove, the overall level of a reproduction signal changes from a recording mark recorded on that indefinite bit, and the error rate of the reproduction signal locally impairs from that recording mark. However, since wobble modulation for a groove adopts 180° (±90°) phase modulation as in the embodiment of the present invention, the land width changes in a symmetrical and sinusoidal pattern at the indefinite bit position on the land. A change in overall level of the reproduction signal from the recording mark has a very predictable pattern close to a sinusoidal pattern. Furthermore, when tracking is stably applied, the indefinite bit position on the land can be estimated in advance. Hence, according to the embodiment of the present invention, a structure that can improve the reproduction signal quality by applying a correction process to the reproduction signal from a recording mark by circuits can be realized.

[1-3] Mixing of Indefinite Bit Due to Land/Groove Recording and Wobble Modulation As information indicating addresses on the information storage medium, the rewritable information storage medium according to this embodiment has three different kinds of address information: zone number information as zone identification information, segment number information as segment address information, and track number information indicating track address information. A segment number means a number in a round, and a track number means a number in a zone. When the zone structure shown in FIG. 8 is adopted, intra-zone identification information and segment address information of the address information assume identical values between neighboring tracks, but track address information assumes different address information values between neighboring tracks.

Figure 10:
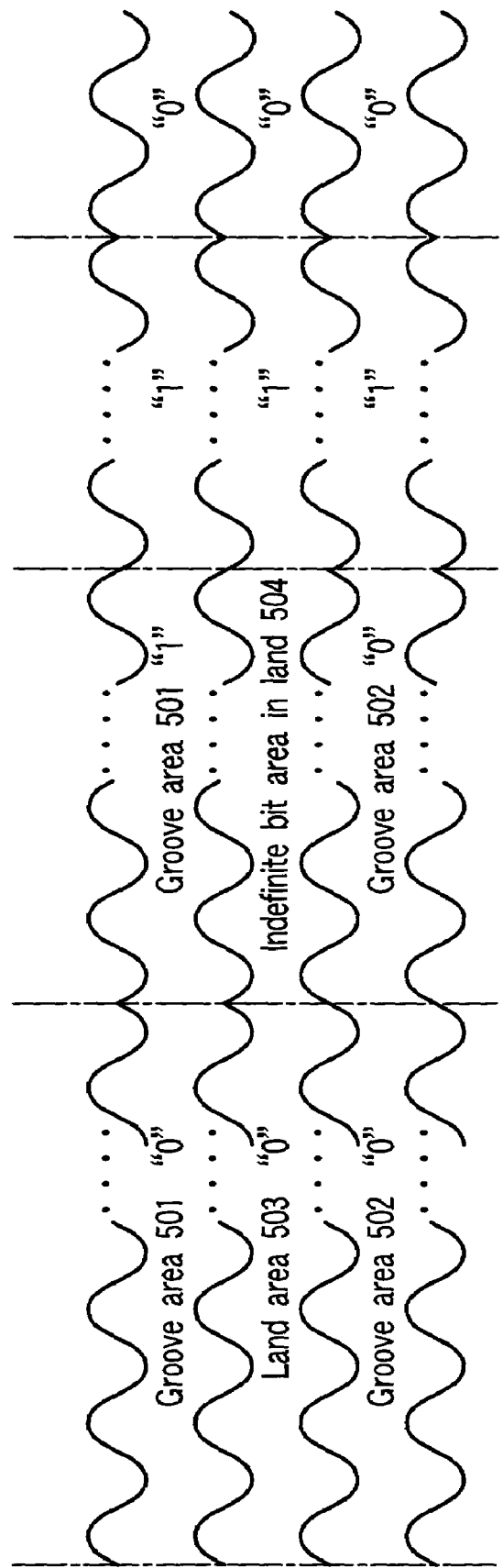
FIG. 10 is a view for explaining an example of wobble modulation in land/groove recording so as to explain generation of an indefinite bit.

A case will be examined below wherein "... 0110 ..." is recorded as track address information in a groove area 501, and "... 0010 ..." is recorded as track address information in a groove area 502, as shown in FIG. 10. In such case, the land width of a land area 503 sandwiched between "1" and "0" of neighboring groove areas periodically changes, thus generating an area where an address bit is not settled by wobbles. In this embodiment, such area will be referred to as an "indefinite bit area 504". When a focused beam spot has passed such indefinite bit area 504, the total amount of light which is reflected by this area and returns via an objective lens (not shown) changes periodically due to a periodical change in land width. Since a recording mark is also formed in the indefinite bit area 504 in the land, the reproduction signal for that recording mark periodically varies due to the above influence, thus degrading the reproduction signal detection characteristics (deteriorating the error rate of the reproduction signal).

[1-4] Contents about Gray Code Adopted in Embodiment of Present Invention

This embodiment uses known Gray codes for the purpose of reducing the frequency of occurrence of the indefinite bit area 504.

FIG. 11 shows Gray codes. The Gray code is characterized in that only 1 bit changes (like alternating binary patterns) every time a decimal number changes by "1".

[Individual Point in Embodiment and Unique Effect of Individual Point]

Gray codes are adopted for track addresses (FIG. 11).

[Effect]

The frequency of occurrence of an indefinite bit on a land due to a change in track number of a groove in land/groove recording+wobble modulation of a groove is suppressed. At the indefinite bit position on the land, the land width locally changes in a symmetrical pattern. As a result, not only a wobble detection signal cannot be obtained from the indefinite bit position on the land, but also the overall level of the reproduction signal from the recording mark recorded on it changes, thus locally degrading the error rate of the reproduction signal from the recording mark. But, by suppressing the frequency of occurrence of an indefinite bit on a land, the frequency of occurrence of such a problem position is suppressed, and the wobble detection signal and the reproduction signal from the recording mark can be stably reproduced.

[2] Wobble Address Format Layout in Rewritable Information Storage Medium

[2-1] Physical Segment Format

The recording format of address information using wobble modulation on the recordable information storage medium of this embodiment will be described below.

Figure 12:
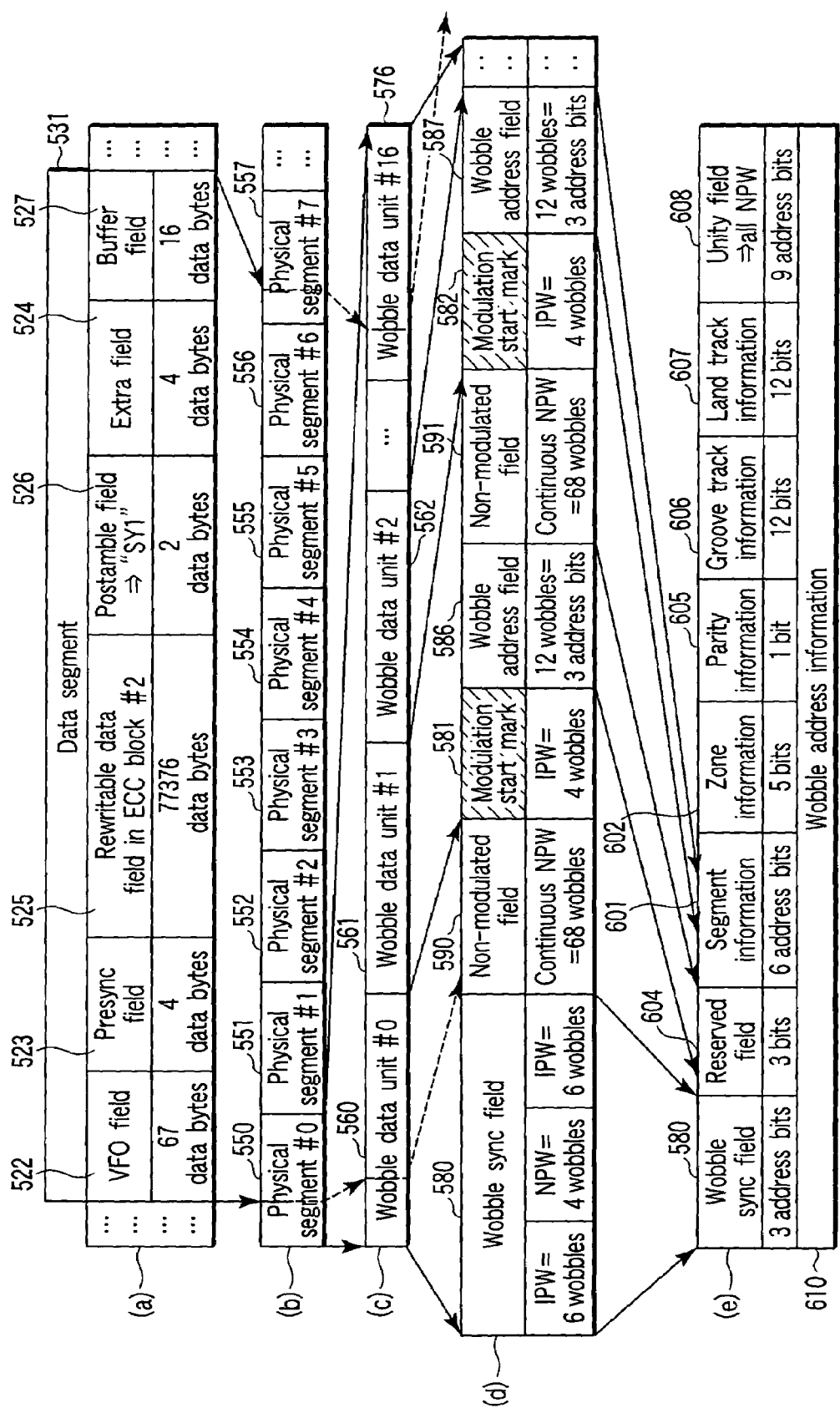
FIG. 12 is a view for explaining an example of a wobble address format on a recordable information storage medium.

The address information setting method using wobble modulation of this embodiment is characterized in that assignment is made using the sync frame length as a unit. Since one sector is formed of 26 sync frames, and one ECC block is formed of 32 sectors, one ECC block includes 26×32=832 sync frames. Since the length of a guard area present between neighboring ECC blocks matches one sync frame length, the total length of one guard area and one ECC block corresponds to 832+1=833 sync frames. Since the value "833" can be factorized into prime factors as follows:

$$833 = 7 \times 17 \times 7 \quad (101)$$

the structure allocation that utilizes this feature is adopted. That is, as shown in FIG. 12(b), a data segment 531 is defined as a basic unit of rewritable data, an area having the same length as the physical length of one data segment 531 is segmented into seven physical segments (#0) 550 to (#6) 556, and wobble information 610 is recorded in advance in a wobble-modulated pattern for each of the physical segments (#0) 550 to (#6) 556. As shown in FIG. 12, the boundary positions the data segment 531 and physical segment 550 do not match and deviate by an amount to be described later. Furthermore, each of physical segments (#0) 550 to (#6) 556 is segmented into 17 wobble data units (WDU) (#0) 560 to (#16) 576 (FIG. 12(c)). As can be seen from equation (101), a length for seven sync frames is assigned to that of each of wobble data units (#0) 560 to (#16) 576. Each of wobble data units (#0) 560 to (#16) 576 is formed of a modulated field for 16 wobbles and a non-modulated field 590 or 591 for 68 wobbles. A characteristic feature of this embodiment lies in that the non-modulated field 590 or 591 has a very large occupation ratio to the modulated field. Since a groove or land of the non-modulated field 590 or 591 is always wobbled at a given frequency, a phase-locked loop (PLL) is applied using these non-modulated fields 590 and 591, and reference clocks upon reproducing recording marks recorded on the information storage medium or recording reference clocks used upon recording new recording marks can be stably extracted (generated).

In this manner, according to this embodiment, by setting a very large occupation ratio of the non-modulated field 590 or 591 to the modulated field, the precision and stability of extraction (generation) of the reproduction or recording reference clocks can be greatly improved. Upon transition from the non-modulated field 590 or 591 to the modulated field, a modulation start mark 581 or 582 is set using four wobbles. Immediately after detection of this modulation start mark 581 or 582, a wobble-modulated wobble address field 586 or 587 appears. In order to extract wobble address information 610 in practice, a wobble sync field 580 and wobble address fields 586 and 587 in wobble segments (#0) 550 to (#6) 556 except for the non-modulated fields 590 and 591 and modulation start marks 581 and 582 are collected, as shown in (d) and (e) of FIG. 12, and are re-allocated, as shown in (e) of FIG. 12. Since this embodiment adopts 180° phase modulation and NRZ, as shown in FIG. 9, an address bit (address symbol)= "0" or "1" is set by the wobble phase=0° or 180°.

As shown in (d) of FIG. 12, three address bits are set using 12 wobbles in each of the wobble address fields 586 and 587. That is, four successive four wobbles form one address bit.

Since this embodiment adopts NRZ, as shown in FIG. 9, no phase change takes place within four successive wobbles in each of the wobble address fields 586 and 587. By utilizing this feature, wobble patterns of the wobble sync field 580 and modulation start marks 581 and 582 are set. That is, wobble patterns which are never generated in the wobble address fields 586 and 587 are set for the wobble sync field 580 and modulation start marks 581 and 582, thus easily identifying the locations of the wobble sync field 580 and modulation start marks 581 and 582. This embodiment is characterized in that four successive wobbles form one address bit in each of the wobble address fields 586 and 587, while a 1-address bit length is set to be a length other than four wobbles at the position of the wobble sync field 580. That is, in the wobble sync field 580, a field where a wobble bit="1" is set to be six wobbles different from four wobbles. In addition, a full modulated field (for 16 wobbles) in one wobble data unit (#0) 560 is assigned to the wobble sync field 580, thus facilitating detection of the start position of wobble address information 610 (the location of the wobble sync field 580).

The contents of wobble address information 610 are as follows.

1. Track Information 606, 607

Each information means a track number in a zone, and groove track information 606 that settles an address on a groove (since no indefinite bit is included, an indefinite bit is generated on a land) and land track information 607 that settles an address on a land (since no indefinite bit is included, an indefinite bit is generated on a groove) are alternately recorded. In only the track information 606 and track information 607, track number information is recorded using Gray codes shown in FIG. 11.

2. Segment Information 601

This information indicates a segment number in a track (within a round in the information storage medium). If a segment number is counted from "0" as the segment address information 601, a pattern "000000" as a run of "0"s for 6 bits appears in the segment address information 601. In such case, it becomes difficult to detect the position of the boundary (black triangle portion) between neighboring address bit areas 511 shown in FIG. 11, and a bit shift that detects the position of the boundary between neighboring 1-address bit areas 511 while being shifted readily occurs. As a result, a determination error of wobble address information due to such bit shift occurs. To avoid this problem, this embodiment is characterized in that the segmented number is counted from "000001".

3. Zone Identification Information 602

This information indicates a zone number in the information storage medium, and records a value "n" of Zone (n) shown in FIG. 8.

4. Parity Information 605

This information is set for error detection upon reproduction from the wobble address information 610. Seventeen address bits from the segment information 601 to reserved information 604 are individually summed, and if the sum is an even number, "0" is set; if it is an odd number, "1" is set.

6. Unity Field 608

As described above, each of the wobble data units (#0) 560 to (#16) 576 is formed of a modulated field for 16 wobbles and the non-modulated field 590 or 591 for 68 wobbles, and the non-modulated field 590 or 591 has a very large occupation ratio to the modulated field. Furthermore, by increasing the occupation ratio of the non-modulated field 590 or 591, the precision and stability of extraction (generation) of the reference or recording reference clocks are improved. A field that includes a unity field 608 shown in (e) of FIG. 12 corresponds to those of the wobble data unit (#16) 576 and wobble data unit (#15) (not shown) immediately before the unit (#16) in (c) of FIG. 12 in their entirety. The unity field 608 has all six address bits="0". Hence, no modulation start marks 581 and 582 are set in the wobble data unit (#16) 576 and wobble data unit (#15) (not shown) immediately before the unit (#16), which include this unity field 608, and a non-modulated field with a uniform phase is formed.

The data structure shown in FIG. 12 will be described in detail below.

The data segment 531 includes a data field 525 that can record 77376 bytes. The length of the data segment 531 is normally 77496 bytes. The data segment 531 includes a 67-byte VFO field 522, a 4-byte presync field 523, the 77376-byte data field 525, a 2-byte postamble field 526, a 4-byte extra field (reserved field) 524, and a 16-byte buffer field 527. FIG. 12(a) shows the layout of the data segment 531.

Data in the VFO field 522 is set to be "7Eh". The modulation state is set in the first byte of the VFO field 522 as State2. The modulation pattern of the VFO field 522 is defined by repeating the following pattern:

"010001 000100"

The extra field 524 is reserved, and all bits are "0b".

Data in the buffer field 527 is set to be "7Eh". The modulation state of the first byte of the buffer field 527 depends on the last byte of the reserved field. The modulation pattern of the buffer field other than the first byte is as follows:

"010001 000100"

Data to be recorded in the data field 525 is called a data frame, scrambled frame, recording frame, or physical sector depending on the stages of signal processes. The data frame includes 2048-byte main data, a 4-byte data ID, a 2-byte ID error detection code (IED), 6-byte reserved data, and a 4-byte error detection code (EDC). After EDC scrambled data is added to the 2048-byte main data in the data frame, a scrambled frame is formed. A cross Reed-Solomon error detection code is assigned across 32 scrambled frames of an ECC block.

Outer parity (PO) and inner parity (PI) data are appended to the recording frame after ECC encoding, thus forming a scrambled frame. PO and PI data are generated for each ECC block including 32 scrambled frames.

After an ETM process that appends a sync code to the head of each recording frame for 91 bytes, the recording data field is converted into the recording frame. Thirty-two physical sectors are recorded in one data field.

Figure 13:
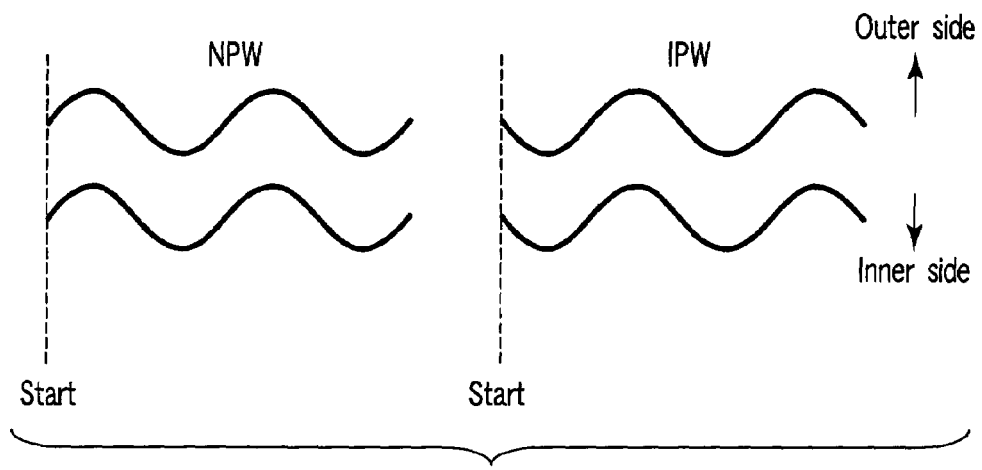
FIG. 13 shows an example of bit modulation rules.

NPW and IPW in FIG. 12 and FIGS. 17 to 21 are recorded on tracks to have waveforms shown in FIG. 13. NPW begins to wobble toward the outer side of the disk, and IPW begins to wobble toward the inner side of the disk. The start point of a physical segment is equal to that of a sync field.

Physical segments line up at wobble addresses in periodic positions (WAP) modulated by wobbles. Each WAP information is indicated by 17 wobble data units. The length of a physical segment is equal to 17 WDUs.

Figure 14:
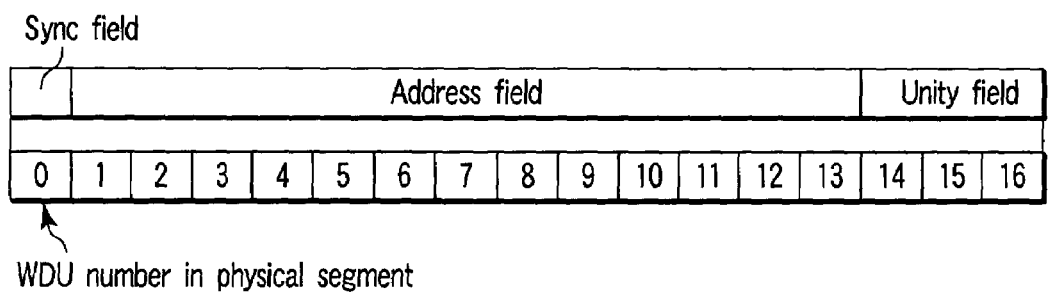
FIG. 14 shows an example of the layout of wobble addresses in periodic positions (WAP)
Figure 15:
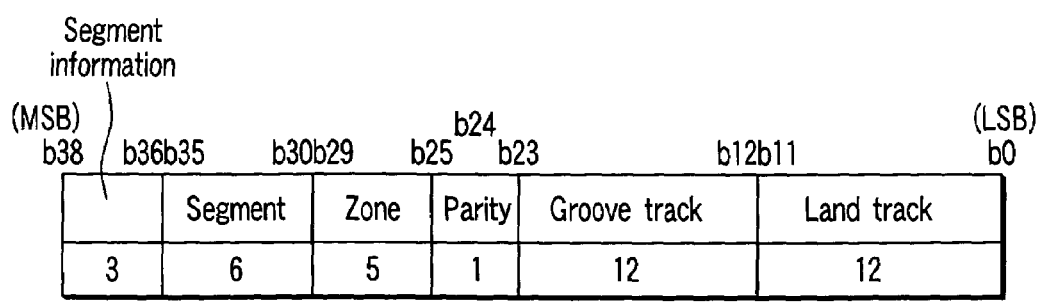
FIG. 15 shows an example of the layout of an address field in the WAP.

FIG. 14 shows the layout of the WAP information. Numerals of respective fields indicate WDU numbers in a physical segment. The first WDU number in the physical segment is zero.

The wobble sync field 580 is bit-synchronized with the start point of a physical segment.

The segment information field is reserved, and all bits are set to be "0b". This field corresponds to the reserved field 604 in FIG. 12. The segment information field 601 indicates a physical segment number on a track (the maximum number of a physical segment per track).

The zone information field 602 indicates a zone number. The zone information field is set to be 0 in a data lead-in area and 18 in a data lead-out area.

The parity information field 605 includes parity data for the segment information field, segment field, and zone field. The parity information field 605 can detect 1-bit errors of these three fields, and is configured by:

$b38 \oplus b37 \oplus b36 \oplus b35 \oplus b34 \oplus b33 \oplus b32 \oplus b31 \oplus b30 \oplus b29 \oplus b28 \oplus b27 \oplus b26 \oplus b25 \oplus b24 = 1$ $\oplus$: exclusive or The groove track information field 606 indicates a track number in a zone and is recorded in the form of a Gray code when the physical segment is located within a groove segment. Respective bits in the groove track field are calculated by:

$g_{11} = b_{11}$ m=11

$g_m = b_{m+1} \oplus b_m$ m=0-10

Figures 16, 17, 18:
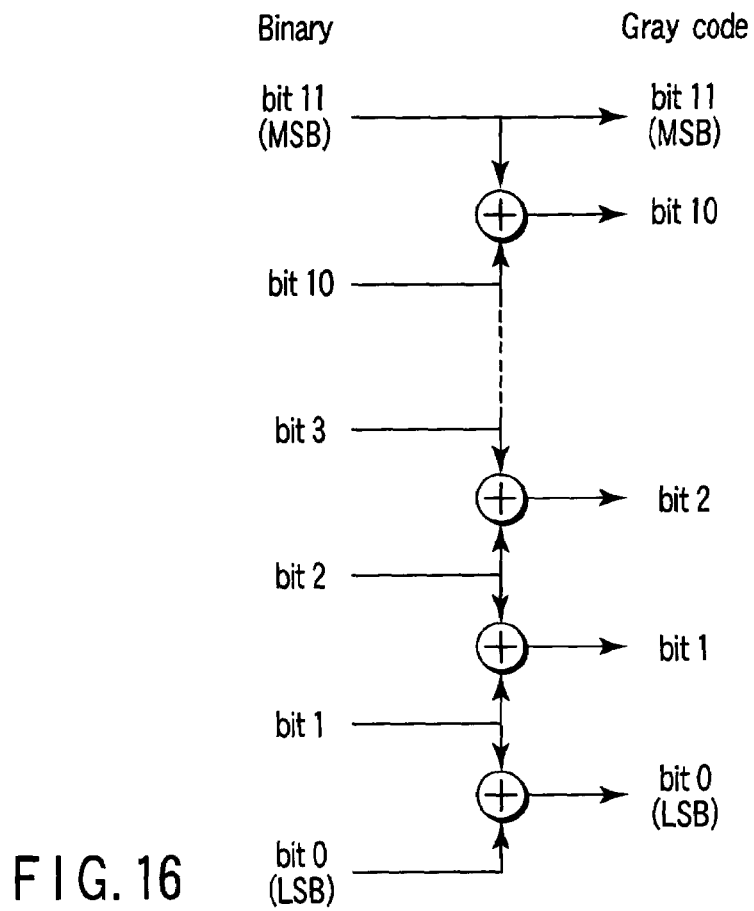
FIG. 16 shows an example of binary/Gray code conversion.
FIG. 17 shows an example of a wobble data unit (WDU) in a sync field.
FIG. 18 shows an example of the WDU in the address field.

$\oplus$: exclusive or where $g_m$ is a Gray code converted from $b_m$ and $b_{m+1}$ (see FIG. 16).

In the groove track field in the land segment, all bits are ignored.

The land track information field 607 indicates a track number in a zone and is recorded in the form of a gray code when the physical segment is located within a land segment. Respective bits in the land track field are calculated by:

$g_{11} = b_{11}$ m=11

$g_m = b_{m+1} \oplus b_m$ m=0-10

$\oplus$: exclusive or where $g_m$ is a Gray code converted from $b_m$ and $b_{m+1}$ (see FIG. 16).

In the land track field in the groove segment, all bits are ignored.

A wobble data unit (WDU) includes 84 wobbles (see FIGS. 17 to 21).

FIG. 17 shows the WDU in the sync field.

FIG. 18 shows the WDU in the address field. Three bits in the address field record "0b" in case of a normal phase wobble (NPW) and "1b" in case of an invert phase wobble (IPW).

FIG. 19 shows the WDU in the unity field. The WDU in the unity field is not modulated.

FIG. 20 shows the WDU of the outer mark.

FIG. 21 shows the WDU of the inner mark.

[Individual Point in Embodiment and Unique Effect of Individual Point]

The physical segment segmentation structure in an ECC block (FIG. 12).

[Effect]

High format compatibility among read-only, write-once, and rewritable media can be assured and, especially, an error correction performance drop of a reproduction signal from recording marks in a rewritable information storage medium can be prevented. Since the number of sectors=32 and the number of segments=7 which form an ECC block have an indivisible relationship (non-multiple relationship), an error correction performance drop of a reproduction signal from recording marks can be prevented.

[Individual Point in Embodiment and Unique Effect of Individual Point]

The wobble non-modulated field (590, 591) has a higher occupation ratio than the wobble modulated field (580 to 587) (FIG. 12(*d*), FIG. 17, FIG. 18).

[Effect]

Since the wobble frequency (wobble wavelength) is constant throughout a given field, this embodiment detects this wobble period to perform:

(1) extraction of reference clocks for wobble address information detection (frequency and phase matching);

(2) extraction of reference clocks for reproduction signal detection upon reproducing a signal from a recording mark (frequency and phase matching); and (3) extraction of recording reference clocks upon forming on rewritable and write-once information storage media (frequency and phase matching).

In this embodiment, wobble address information is recorded in advance using wobble phase modulation. When wobble phase modulation is carried out, if a reproduction signal is filtered by a band-pass filter for the purpose of waveshaping, the amplitude of the detection signal waveform becomes small before and after the phase change position.

Therefore, when the frequency of occurrence of phase change points due to phase modulation is high, many waveform amplitude variations occur, and the clock extraction prediction drops. When the frequency of occurrence of phase change points in a modulated field is low, bit shift readily takes place upon detection of wobble address information. To solve this problem, in this embodiment, a modulated field by phase modulation and a non-modulated field are formed, and the non-modulated field has a higher occupation ratio than the modulated field, thus improving the clock extraction precision. In this embodiment, since the switching position of the modulated field and non-modulated field can be predicted in advance, the non-modulated field is gated to detect a signal of only the non-modulated field, and clock extraction is made from that detection signal.

Modulated fields are distributed and allocated to distribute and record wobble address information 610 (FIG. 12(*d*), FIG. 14).

[Effect]

When wobble address information 610 is concentrated and recorded in one location in the information storage medium, if dust and scratches are attached to the surface, it becomes difficult to detect all pieces of information. As shown in FIG. 12(*d*), in this embodiment, wobble address information 610 is distributed and allocated in 3 address bits (12 wobbles) included in each of the wobble data units 560 to 576, and clustered information is recorded for respective address bits an integer multiple of 3 address bits, thus allowing detection of another information even when information at a given location cannot be detected due to the influence of dust and scratches.

The wobble sync information 580 is made up of 12 wobbles (FIG. 12(*d*)).

[Effect]

The physical length upon recording the wobble sync information 580 matches the 3-address bit length. Since a 1-address bit is expressed by 4 wobbles in the wobble address field, no wobble pattern change other than that every four wobbles occurs in the wobble address field. By utilizing such phenomenon, since impossible wobble pattern changes in the wobble address field, i.e., 6 wobbles→4 wobbles→6 wobbles, cannot take place, the detection precision of the wobble sync field 580 different from the wobble address fields 586 and 587 can be improved.

The 5-address bit zone information 602 and 1-address bit parity information 605 are allocated at neighboring positions (FIG. 12(*e*)).

[Effect]

Summing the 5-address bit zone information 602 and 1-address bit parity information 605 yields 6 address bits as an integer multiple of 3 address bits, and even when information at a given location cannot be detected due to the influence of dust and scratches, another information can be detected.

The unity field 608 is expressed by 9 address bits (FIG. 12(*e*)).

[Effect]

The unity field 608 is expressed by an integer multiple of 3 address bits that can be stored in identical wobble data units.

[Individual Point in Embodiment and Unique Effect of Individual Point]

Address information is recorded by land/groove recording+wobble modulation (FIG. 10).

[Effect]

Greatest capacity can be attained. The recording efficiency can be improved by forming recording marks on both the grooves and lands rather than forming them on only the grooves. Also, when addresses are recorded in advance as prepits, recording marks cannot be recorded at prepit positions. However, according to this embodiment, since recording marks can be recorded to be superposed on wobble-modulated groove/land areas, the wobble modulation address information recording method can assure higher recording efficiency of recording marks than the prepit address method. Therefore, the method that adopts both the schemes is suited to attain a largest capacity.

[Individual Point in Embodiment and Unique Effect of Individual Point]

Figure 28:
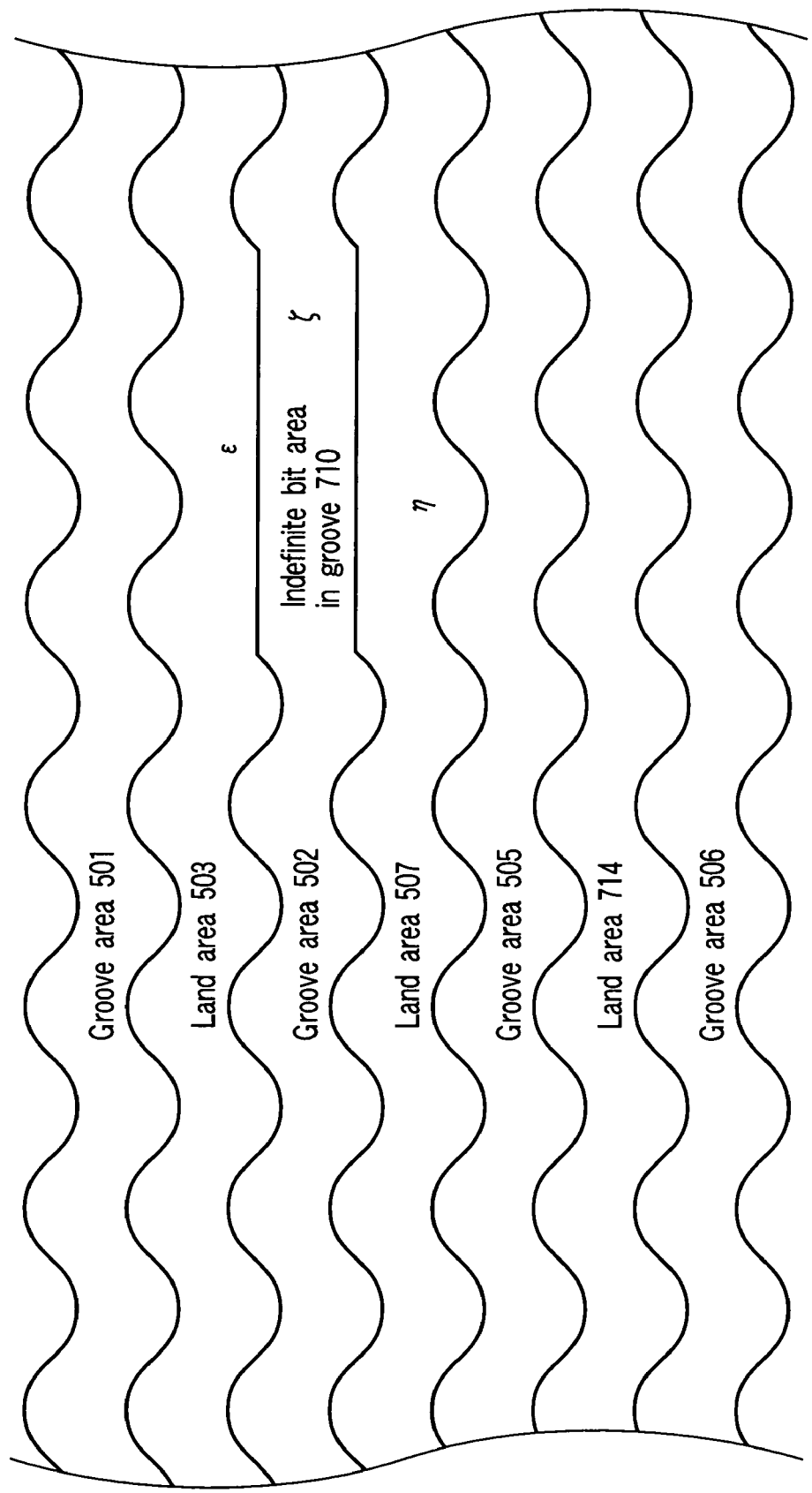
FIG. 28 shows another example of allocation of an indefinite bit in a groove region in land/groove recording.

Indefinite bits are also distributed and allocated in a groove field (track information 606, 607 in FIG. 12(*e*), FIG. 28).

[Effect]

Since a land portion is also provided with a field that can settle a track address without generating any indefinite bit, precise address detection can also be made on the land portion.

The groove width is locally changed upon formation of grooves to generate a constant land width area.

The exposure amount is locally changed upon formation of the groove area to change the groove width.

Two exposure focused beam spots are used upon formation of the groove area to change the groove width by changing the interval between the two spots.

An indefinite bit is allocated in the groove area by changing the wobble amplitude width of the grooves (FIG. 28).

[Individual point in Embodiment and Unique Effect of Individual Point]

Indefinite bits are distributed and allocated on both land and groove by land/groove recording+wobble modulation (track information 606, 607 in FIG. 12(*e*), FIG. 28).

[Effect]

When indefinite bits are concentrated and allocated on either the lands or grooves, the frequency of occurrence of detection errors upon reproduction of address information from a portion where indefinite bits are concentrated and allocated becomes very high. Since indefinite bits are distributed and allocated on both the lands and grooves, the risk of detection errors is distributed, and a system which can stably and easily detect address information as a whole can be provided.

Upon locally changing the groove width, the groove width is controlled to obtain a constant land width of a neighboring portion.

An indefinite bit is generated on the groove area of the groove-width changed portion, but any indefinite bit can be avoided in the land area of the neighboring portion since its width is maintained constant.

[2-2] Recording Data Recording/Rewrite Method

Figure 22:
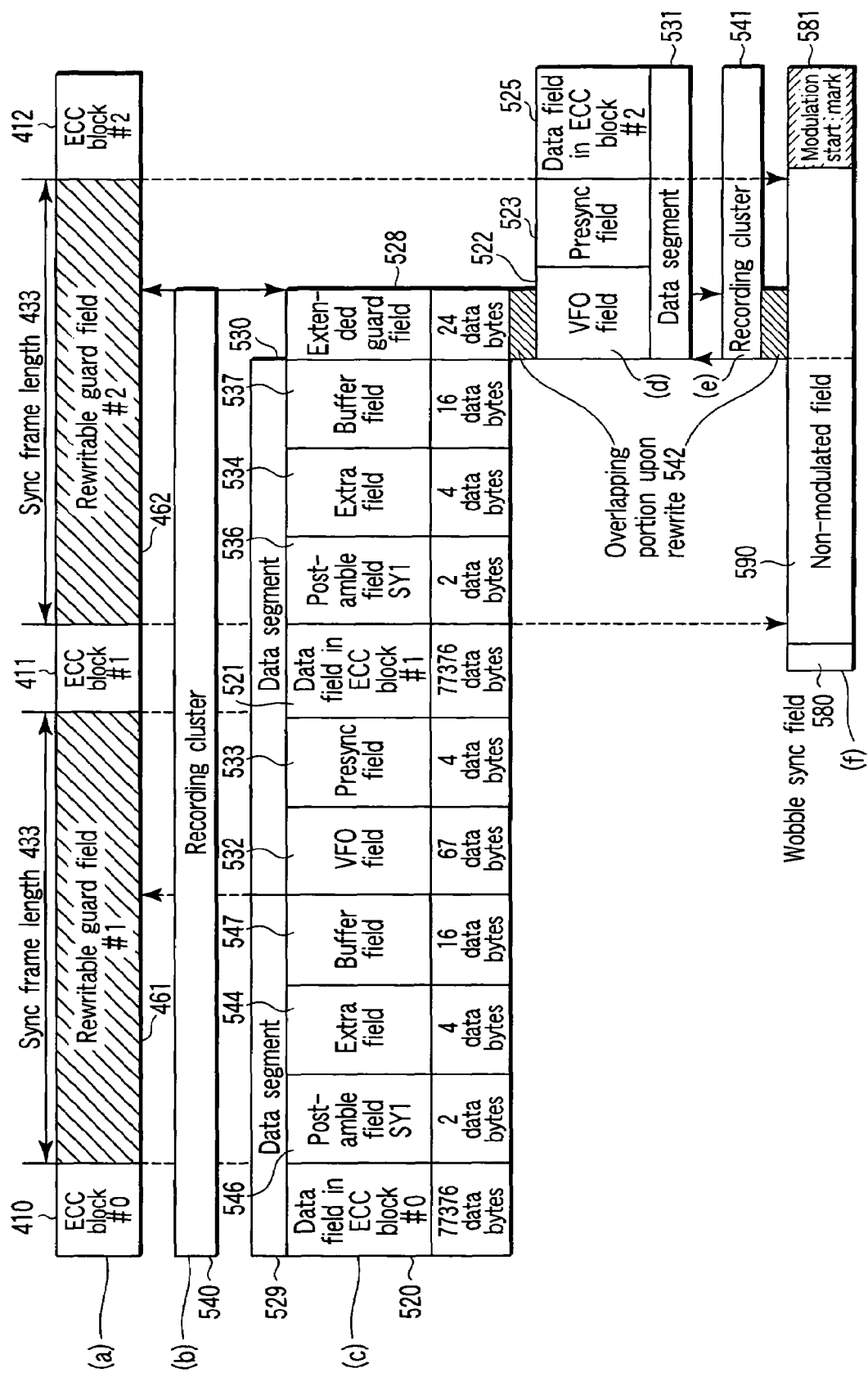
FIG. 22 is an explanatory view of an example of a data recording data of rewritable data which is recorded on a rewritable information storage medium.

FIG. 22 shows the recording format of rewritable data to be recorded on the rewritable information storage medium. In this embodiment, rewritable data is rewritten using each of recording clusters 540 and 541 shown in (b) and (e) of FIG. 22 as a unit. As will be described later, one recording cluster includes one or more data segments 529 to 531 and extended guard field 528 allocated at the end of the cluster. More specifically, the start position of one recording cluster 541 matches that of the data segment 531, and starts from the VFO field 522. When a plurality of data segments 529 and 530 are continuously recorded, they are continuously recorded in a single recording cluster 531, as shown in (b) and (c) of FIG. 22. Also, since a buffer field 547 allocated at the end of the data segment 529 is contiguous to a VFO field 532 located at the head of the next data segment, the phases of recording reference clocks upon recording these segments match. Upon completion of continuous recording, the extended guard field 528 is allocated at the last position of the recording cluster 540.

The extended guard field 528 has a data size for 24 data bytes as data before modulation.

As can be seen from (a) and (c) of FIG. 22, rewrite guard fields 461 and 462 respectively include postamble fields 546 and 536, extra fields 544 and 534, buffer fields 547 and 537, VFO fields 532 and 522, and presync fields 533 and 523, and the extended guard field 528 is allocated at only the continuous recording end position.

For the purpose of comparison of the physical ranges of rewrite units, FIG. 22(c) shows a part of the recording cluster 540 as an information rewrite unit, and FIG. 22(d) shows a part of the recording cluster 541 as the next rewrite unit. This embodiment is characterized in that write is made to make the extended guard field 528 and VFO field 522 on the trailing side partially overlap each other at an overlapping portion 542 upon rewrite. Since a rewrite is made so that the fields partially overlap each other, inter-layer crosstalk in a single-sided/double-recording layer recordable information storage medium can be removed.

The recording clusters 540 and 541 are also allocated in the data lead-in area, data area, and data lead-out area.

Each of the recording clusters 540 and 541 includes one or more data segments 529 and 530 and the extended guard field 528 (see FIG. 23). The length of each of the data segments 529 and 530 is equal to that of seven physical segments. The number of recording clusters 540 and 541 is one per recording.

A data segment in a land track does not include any gap. A data segment in a groove track does not include any gap. The start physical segment number of the data segment is expressed by:

{(number of physical segments per track)×(track number)+(physical segment number)}mod7=0 where "A mod B" is the remainder upon dividing A by B.

That is, the above equation means that recording starts from a multiple position of 7 as the physical segment.

FIG. 23 shows the layout of the recording clusters 540 and 541. Numerals in FIG. 23 indicate the lengths of fields using bytes.

In FIG. 23, "n" is 1 or more.

Data in the extended guard field 528 is "7Eh", and the modulation pattern of the extended guard field 528 is defined by repeating the following pattern:

"010001 000100"

The actual start position of the recording cluster is within ±1 bytes with respect to the theoretical start position separated by 24 wobbles from the start position of the physical segment. The theoretical start position starts from the NPW start position (see FIG. 24).

Figure 24:
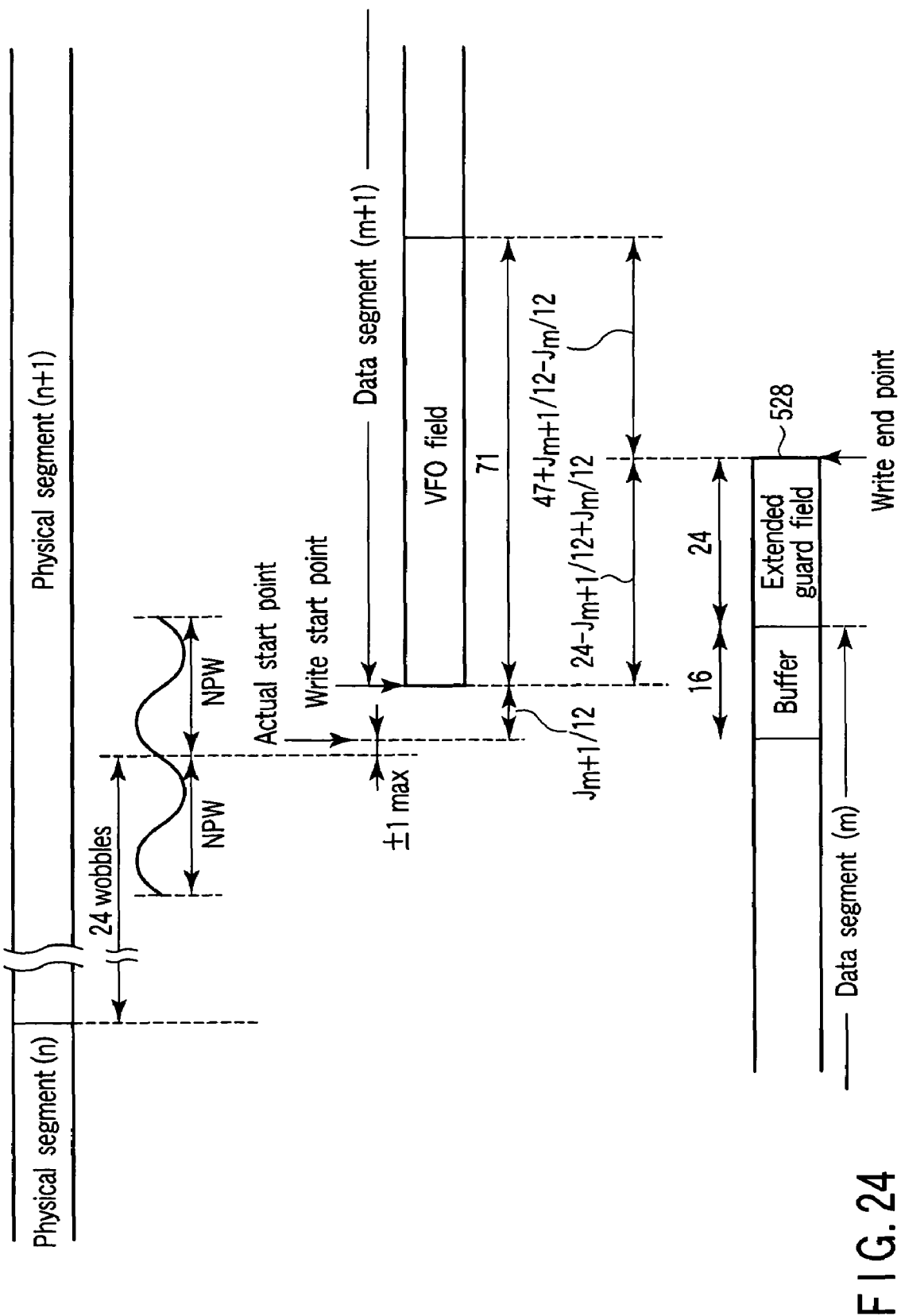
FIG. 24 shows an example of the layout of linking.

The start position of the recording cluster shifts by J/12 bytes from the actual start position to set identical average probabilities of mark and space positions on the recording layer after many overwrite cycles (see FIG. 24).

Numerals in FIG. 24 are lengths indicated by bytes. Jm randomly changes from 0 to 167, and Jm+1 randomly changes from 0 to 167.

As can be seen from FIG. 12(a), the rewritable data size in one data segment in this embodiment is given by:

$$67+4+77376+2+4+16=77469 \text{ data bytes} \quad (102)$$

As can be seen from (c) and (d) of FIG. 12, one wobble data unit 560 is formed of:

$$6+4+6+68=84 \text{ wobbles} \quad (103)$$

Seventeen wobble data units form one physical segment 550, and the length of seven physical segments 550 to 556 matches that of one data segment 531. Hence, within the length of one data segment 531, $$84 \times 17 \times 7 = 9996 \text{ wobbles} \quad (104)$$

are allocated. Therefore, one wobble corresponds to:

$$77496 \div 9996 = 7.75 \text{ data bytes/wobble} \quad (105)$$

As shown in FIG. 24, the overlapping portion of the next VFO field 522 and extended guard field 528 is located 24 wobbles after the start position of the physical segment. As can be seen from FIG. 12(d), 16 wobbles from the head of the physical segment 550 correspond to the wobble sync field 580, but 68 wobbles after them are within the non-modulated field 590.

Therefore, the overlapping portion of the next VFO field 522 and extended guard field 528 falls within the non-modulated field 590.

The recording film in the rewritable information storage medium of this embodiment adopts a phase change recording film. In the phase change recording film, since the recording film begins to deteriorate near the rewrite start/end position, if recording start/end is repeated at an identical position, the number of rewrite times is limited due to deterioration of the recording film. In this embodiment, in order to reduce the aforementioned problem, the recording start position is randomly shifted by Jm+1/12 data bytes upon rewrite, as shown in FIG. 24.

In (c) and (d) of FIG. 12, the head position of the extended guard field 528 matches that of the VFO field 522 so as to explain the basic concept. However, strictly speaking, in this embodiment, the head position of the VFO field 522 is randomly shifted, as shown in FIG. 24.

A DVD-RAM disk as the existing rewritable information storage medium uses a phase change recording film as the recording film, and the recording start/end position is randomly shifted to improve the number of rewrite times. The maximum shift range upon random shift in the existing DVD-RAM disk is set to be 8 data bytes. The channel bit length in the existing DVD-RAM disk (as modulated data recorded on the disk) is set to be 0.143 µm on the average. The channel bit length of the rewritable storage medium of this embodiment is set to fall within the range of 0.087 to 0.093 µm and, hence, the average channel bit length is given by:

$$(0.087+0.093) \div 2 = 0.090 \, \mu m \quad (106)$$

When the length of the physical shift range is set in correspondence with that of the existing DVD-RAM disk, the minimum required length as the random shift range of this embodiment is set using the aforementioned value by:

$$8 \, bytes \times (0.143 \, \mu m \div 0.090 \, \mu m) = 12.7 \, bytes \quad (107)$$

In this embodiment, in order to assure ease of a reproduction signal detection process, the unit of the random shift amount is set in correspondence with the channel bit after modulation. Since this embodiment adopts eight-to-twelve modulation (ETM) that converts 8 bits into 12 bits as modulation, the random shift amount is mathematically expressed with reference to data bytes by:

$$Jm/12 \, data \, bytes \quad (108)$$

Since a value that Jm can assume is given using the value of equation (107) by:

$$12.7 \times 12 = 152.4 \quad (109)$$

Jm assumes a value ranging from 0 to 152. For the aforementioned reasons, the random shift range length matches that of the existing DVD-RAM disk as long as it falls within the range that satisfies equation (109), the number of rewrite times equivalent to that of the existing DVD-RAM disk can be guaranteed. In this embodiment, in order to assure the number of rewrite times more than the existing disk, a slight margin is provided to the value of equation (107) to set:

$$Random \, shift \, range \, length = 14 \, data \, bytes \quad (110)$$

Since substitution of the value of equation (110) into (108) yields 14×12=168, the value that Jm can assume is set by:

$$Jm = 0 \, to \, 167 \quad (111)$$

In FIG. 22, the lengths of the buffer field 547 and VFO field 532 in the recording cluster 540 are constant. As can be seen from FIG. 23, the random shift amounts Jm of all the data segments 529 and 530 have the same value throughout the single recording cluster 540. When one recording cluster 540 including many data segments is to be continuously recorded, the recording position is monitored based on wobbles. That is, the recording position on the information storage medium is confirmed simultaneously with recording by detecting the position of the wobble sync field 580 shown in FIG. 12 or by counting the number of wobbles in the non-modulated fields 590 and 591. At this time, a wobble slip (to record at a position shifted by one wobble period) occurs due to a wobble count error or rotation nonuniformity of a rotation motor that rotates the information storage medium, and the recording position on the information storage medium is displaced on rare occasions.

The information storage medium of this embodiment is characterized in that when the recording position error that has occurred as described above is detected, adjustment is made within the rewritable guard field 461 in FIG. 22 to correct the recording timing. In FIG. 22, the postamble field 546, extra field 544, and presync field 533 record important information that does not allow bit omission or repetition. However, since specific patterns are repeated in the buffer field 547 and VFO field 532, omission or repetition of only one pattern is permitted as long as this repetition boundary position is assured. Therefore, in this embodiment, adjustment is made in the buffer field 547 or VFO field 532 especially in the guard field 461 to correct the recording timing.

As shown in FIG. 24, an actual start point position serving as the position setting reference is set to match the position of a wobble amplitude "0" (wobble center). However, since the wobble position detection precision is low, as described by "±1 max" in FIG. 24, this embodiment permits:

$$Actual \, start \, point \, position = shift \, amount \, up \, to \, maximum \, of \, \pm 1 \, data \, byte \quad (112)$$

In FIGS. 22 and 24, the random shift amount of the data segment 530 is set to be Jm (as described above, the random shift amounts of all data segments 529 in the recording cluster 540 match), and that of the data segment 581 to be additionally recorded after the segment 530 is set to be Jm+1. For example, a median is assumed as a value that Jm and Jm+1 can assume, i.e., Jm=Jm+1=84. When the actual start point position precision is sufficiently high, the start position of the extended guard field 528 matches that of the VFO field 522, as shown in FIG. 22.

In contrast, if the data segment 530 is recorded at a maximally trailing position and the data segment 531 to be additionally recorded or rewritten is recorded at a maximally leading position, the head position of the VFO field 522 may get into the buffer field 537 by a maximum of 15 data bytes on the basis of the value specified by equation (110) and that of equation (112). The extra field 534 immediately before the buffer field 537 records specific important information. Therefore, in this embodiment, it is required to have:

$$Length \, of \, buffer \, field \, 537 \geq 15 \, data \, bytes \quad (113)$$

In the embodiment shown in FIG. 22, the data size of the buffer field 537 is set to be 16 data bytes by adding a margin for 1 data byte.

If a gap is formed between the extended guard field 528 and VFO field 522 as a result of random shift, inter-layer crosstalk occurs due to that gap upon reproduction when a single-sided/double-recording layer structure is adopted. For this reason, it is designed to make the extended guard field 528 and VFO field 522 always overlap each other so as not to form any gap even after random shift. Therefore, in this embodiment, the length of the extended guard field 528 is set to be 15 data bytes or more for the same reason as that of formula (113). Since the trailing VFO field 522 has a sufficiently large length, i.e., 71 data bytes, no problem occurs in signal reproduction even when the overlapping field between the extended guard field 528 and VFO field 522 slightly broadens (since the non-overlapping VFO field 522 can sufficiently assure the long time required to synchronize reproduction reference clocks). Therefore, the length of the extended guard field 528 can be set to be a value larger than 15 data bytes. As has been explained above, a wobble slip occurs upon continuous recording at rare occasions, and the recording position is displaced by one wobble period. Since one wobble period corresponds to 7.75 (about 8) data bytes, as given by equation (105), equation (113) takes this value into consideration, and this embodiment sets:

$$Length \, of \, extended \, guard \, field \, 528 = (15+8=) \, 23 \, data \, bytes \, or \, more \quad (114)$$

In the embodiment shown in FIG. 22, the length of the extended guard field 528 is set to be 24 data bytes by adding a margin for 1 data byte as in the buffer field 537.

In FIG. 22(e), the recording start position of the recording cluster 541 must be precisely set. The information recording/ reproduction apparatus of this embodiment detects this recording start position using wobble signals which are recorded in advance on the rewritable or write-once information storage medium. As can be seen from FIG. 12(d), wobble patterns change from NPW to IPW in increments of 4 wobbles in all fields other than wobble sync field 580. In contrast, since the wobble switching unit is partially shifted from 4 wobbles in the wobble sync field 580, the position of the wobble sync field 580 can be detected most easily. For this reason, the information recording/reproduction apparatus of this embodiment makes preparation for a recording process after it detects the position of the wobble sync field 580, and then starts recording. Therefore, the start position of the recording cluster 541 must be allocated in the non-modulated field 590 immediately after the wobble sync field 580.

FIG. 24 shows the contents. The wobble sync field 580 is allocated immediately after switching of a physical segment. As shown in FIG. 12(d), the length of the wobble sync field 580 matches 16 wobble periods. Furthermore, after detection of the wobble sync field 580, preparation for the recording process requires 8 wobble periods in expectation of a margin. Therefore, the head position of the VFO field 522 located at the head position of the recording cluster 541 must be allocated at a position 24 wobbles behind the switching position of a physical segment in consideration of random shift.

As shown in FIG. 22, recording processes are repeated at the overlapping portion 542 upon rewrite. If a rewrite is repeated, the physical shape of the wobble groove or land changes (deteriorates), and wobble reproduction signal quality from there drops. In this embodiment, as shown in FIG. 22(f) or (a) and (d) in FIG. 12, it is designed to avoid the overlapping portion 542 upon rewrite from being allocated in the wobble sync field 580 or wobble address field 586, and to record it in the non-modulated field 590. Since given wobble patterns (NPW) are merely repeated in the non-modulated field 590, even when the quality of wobble reproduction signals partially deteriorates, these signals can be compensated for using wobble reproduction signals before and after the signals.

[Individual Point in Embodiment and Unique Effect of Individual Point]

Some fields in a guard area are recorded to overlap each other in the recording format for the recordable information storage medium.

As shown in FIG. 13, the extended guard field 528 and next VFO field 522 partially overlap to form the overlapping portion 542 upon rewrite (FIG. 22, FIG. 24).

[Effect]

If a gap (a portion where no recording marks are formed) is formed between leading and trailing guard areas between segments, a light reflectance difference is produced when viewed macroscopically in that gap portion due to the light reflectance difference of the presence/absence of recording marks. For this reason, when the single-sided/double-recording layer structure is adopted, an information reproduction signal is disturbed by the influence from that portion, thus causing many reproduction errors. Since the guard area partially overlaps as in this embodiment, a gap where no recording marks are present can be prevented from being generated, and the influence of inter-layer crosstalk from an existing recording area in the single-sided/double-recording layer structure can be removed, and a stable reproduction signal can be obtained.

The overlapping portion 542 upon rewrite is set to be recorded in the non-modulated field 590.

[Effect]

Since the overlapping portion 542 upon rewrite is set to be allocated within the non-modulated field 590, deterioration of the wobble reproduction signal quality due to shape deterioration in the wobble sync field 580 or wobble address field 586 can be prevented, and a stable wobble detection signal from the wobble address information 610 can be guaranteed.

The VFO field in the data segment starts from a position 24 wobbles behind the head of the physical segment.

The extended guard field 528 is formed at the end of a recording cluster indicating a rewrite unit.

[Effect]

Since the extended guard field 528 is formed at the end of a recording cluster, the recording cluster 540 at the leading side and the recording cluster 541 on the trailing side in FIG. 22 can be set to always partially overlap each other. Since no gap is formed between the recording cluster 540 at the leading side and the recording cluster 541 on the trailing side, a reproduction signal can be stably obtained from recording marks without any influence of inter-layer crosstalk in the rewritable or write-once information storage medium with the single-sided/double-recording layer structure, thus assuring high reliability upon reproduction.

The size of the extended guard field 528 is 15 data bytes or more.

[Effect]

From the reason for formula (113), no gap appears between the recording clusters 540 and 541 even after random shift, and a reproduction signal can be stably obtained from recording marks without any influence of inter-layer crosstalk.

The size of the extended guard field 528 is set to be 24 bytes.

[Effect]

From the reason for equation (114), no gap appears between the recording clusters 540 and 541 even in consideration of any wobble slip, and a reproduction signal can be stably obtained from recording marks without any influence of inter-layer crosstalk.

The range of the random shift amount is set to be larger than Jm/12 (0≦Jm≦154).

[Effect]

Since equation (109) is satisfied, and the physical range length for the random shift amount matches that of the existing DVD-RAM, the number of times of repetitive recording equivalent to that of the existing DVD-RAM can be assured.

The size of the buffer field is set to be 15 data bytes or more.

[Effect]

From the reason for formula (113), the extra field 537 in FIG. 13 is never overwritten by the neighboring VFO field 522 even after random shift, and data reliability in the extra field 534 can be assured.

[Individual Point in Embodiment and Unique Effect of Individual Point]

The recording cluster indicating a rewrite unit is formed of one or more data segments (FIG. 22(c), FIG. 23).

[Effect]

A mixed recording process of PC data (PC files) which are often rewritten with small data sizes many times and AV data (AV files) which are continuously recorded with a large data size onto a single information storage medium is facilitated.

Data used for a personal computer are normally frequently rewritten with relatively small data sizes. Therefore, by setting a rewrite or write-once data unit as small as possible, a recording method suited to PC data is set. In this embodiment, one ECC block is formed of 32 sectors. A minimum unit of an efficient rewrite or write-once process is so set as to execute that process for respective data segments each including only one ECC block. Therefore, the recording structure in this embodiment in which the recording cluster that represents a rewrite unit includes one or more data segments is suited to PC data (PC files). As AV (audio visual) data, video information and audio information with a very large size must be continuously recorded without being interrupted. In this case, data to be recorded continuously are recorded together as one recording cluster. When the random shift size, the structure in a data segment, the attribute of a data segment, and the like are switched for each data segment that forms one recording cluster upon recording AV data, the switching process takes a long time, and the continuous recording process becomes difficult to attain.

As shown in FIG. 23, in this embodiment, since the recording cluster is formed by continuously arranging data segments with an identical format (without changing the attribute or random shift amount or without inserting any specific information between data segments), the recording format which can record data with a large size and is suited to AV data recording can be provided. In addition, since the recording cluster can have a simple structure, a simple recording control circuit and reproduction detection circuit can be adopted, thus achieving a price reduction of the information recording/reproduction apparatus or information reproduction apparatus.

The data structure in the recording cluster 540 (FIG. 22; except for the extended guard field 528) in which the data segments 529 and 530 are continuously arranged is the same as that in a read-only information storage medium. Although not shown, the same structure is adopted for a write-once information storage medium in this embodiment. In this way, since the common data structure is adopted for all information storage media independently of read-only, write-once, and rewritable media, compatibility among media can be assured, and a detection circuit of the information recording/reproduction apparatus or information reproduction apparatus for which the compatibility is assured can be commonly used, thus assuring high reproduction reliability and a low price.

The random shift amounts of all data segments in a single recording cluster match.

[Effect]

In this embodiment, since the random shift amounts of all data segments in a single recording cluster match, when reproduction is made across different data segments in a single recording cluster, no synchronization control (to reset the phase) is required in the VFO field (532 in FIG. 22), thus simplifying a reproduction detection circuit and assuring high reliability of reproduction detection upon continuous reproduction.

Adjustment is made in the guard field allocated between ECC blocks to correct the recording timing.

[Effect]

Data in ECC blocks 410 and 411 in the data structure shown in FIG. 22(*c*) are those which are to undergo error correction, and their data omission is basically undesirable even by 1 bit.

In contrast, since data in the buffer field 547 and VFO field 532 are recorded by repeating an identical pattern, no problem is posed even when partial omission or repetition occurs while assuring the division of repetitive patterns. Therefore, when a recording position error is detected upon continuous recording, adjustment is made within the guard field 461 to correct the recording timing without any influence on data in the ECC blocks 410 and 411, thus allowing stable recording/reproduction control.

The recording cluster start position is recorded from the non-modulated field immediately after the wobble sync field.

[Effect]

Since recording starts immediately after the wobble sync field 580 which can be detected most easily is detected, high recording start position precision can be assured, and a stable recording process is allowed.

Recording starts from a position 24 wobbles or more after the switching position of a physical segment.

[Effect]

Since the detection time of the wobble sync field 580 and the preparation time of a recording process can be assured accordingly, a stable recording process can be guaranteed.

[2-3] Recording Method and Reproduction Method of Track Information

Some examples of a wobble modulation method associated with the groove track information 606 and land track information 607 shown in FIG. 12(*e*) and its reproduction method will be explained below.

When wobble modulation is applied to have a constant groove width so as to embed address information, an area where a track width changes is locally generated in a land portion, and address data of that portion becomes an indefinite bit (the level of a wobble signal drops, and it is possible to detect data using that generated portion but reliability may drop if many noise components are produced). Since the groove width is partially changed by utilizing this seemingly disadvantageous phenomenon, a groove wobble modulation process can be made as if data were recorded on a land track.

Figures 25, 26:
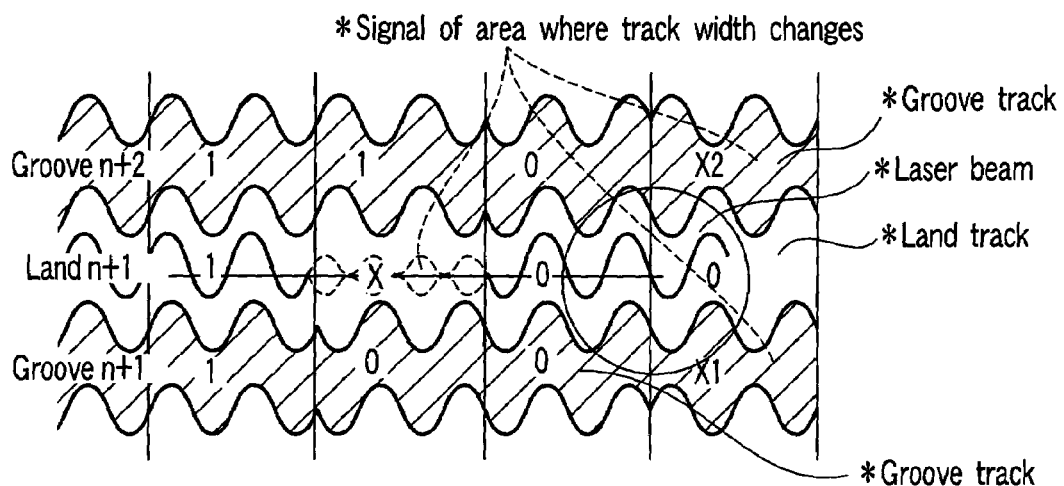
FIG. 25 shows an example of address information embedding of a land track.
FIG. 26 shows an example of land addresses formed by changing the groove width.

FIG. 25 shows the relationship among groove n+1, land n+1, and groove n+2. In wobble modulation of the groove n+1 track, address data ( . . . 100X2 . . . ) is recorded. In this case, region X1 of groove n+1 is formed by amplitude modulation that changes the groove width to form land n="1" of and land n+1="0". Likewise, region X2 of groove n+2 is formed by amplitude modulation that changes the groove width to form land n+1="0" and land n+2="1". When the method that partially changes the groove width is introduced in this way, even when the address data of land tracks that confront a land track are different each other, wobble modulation that can detect required land data correctly can be made.

In the embodiment shown in FIG. 12(*e*), land and groove address data are allocated in the areas of the groove track information 606 and land track information 607. That is, the groove width is matched throughout the groove track information 606 to record groove-side track address information using the Gray codes shown in FIG. 11 by wobble modulation (by allocating indefinite bits by locally changing the land-side width); and the land width is matched throughout the land track information 607 to record land-side track address information using the Gray codes shown in FIG. 11 by wobble modulation (by allocating indefinite bits by locally changing the groove-side width).

In this case, the following effects are obtained.

Upon tracing on a groove, the groove track information 606 whose track number is settled is reproduced. The track number of the land track information 607 can be predicted using a track number odd/even determination technique, as will be described later.

Upon tracing on a land, the land track information 607 whose track number is settled is reproduced. The track number of the groove track information 606 can be predicted using a track number odd/even determination technique, as will be described later.

In this manner, a portion where the track address information of a groove is settled without including any indefinite bits in a groove area and a portion where indefinite bits are included but the track address of a groove can be predicted by a method to be described later in a groove area can be set in a single track. In such case, a portion where the track address information of a land without including any indefinite but in a land area and a portion where indefinite bits are included but the track address of a land can be predicted by a method to be described later in a land area can be simultaneously set in advance in a single track.

FIG. 26 shows another example in which the land addresses are formed by changing the groove width. This example is characterized in that a G sync signal (G-S) used to identify a groove track address position is allocated at the head positions of groove track information and land track information so as to allow easy detection of the track information position, compared to the address setting method shown in FIG. 12(*e*). In this case, if corresponding land address data are different from each other, they are recorded by changing the groove width as if they were recorded by wobble modulation of the land tracks. With this process, in address information detection upon land track recording/reproduction, a correct detection signal can be obtained. In FIG. 26, groove and land track address data are separately allocated. However, the land and groove address data can be formed by identical groove wobbling modulation using the technique for changing the groove width.

FIG. 27 shows such example. It is possible to form significant land and groove address data by a single groove wobble as long as odd/even identification of a land can be made, as described above. Groove width modulation can be used in this odd/even identification. That is, in this method, "0" for an odd land and "1" for an even land are allocated at bits after the track numbers in FIG. 27. Since the track number of a groove track is settled, even when a redundant bit is appended after the track number, the detected bit can be ignored. On a land track, an odd or even land can be determined by checking whether a bit is "0" or "1" after track number detection. On a land track, the track number is consequently settled by a data sequence including odd/even track identification data, and groove/land address data can be detected without any special odd/even track identification mark. Furthermore, a change region of the track width which is generated in only a land track due to the Gray codes is also generated in a groove track, and the groove/land detection system can be formed by the same method, thus optimizing the system balance.

As a method of distributing and allocating indefinite bits, in addition to:

(i) a method of locally changing an exposure amount on a photoresist layer coated on the master disk surface upon creating a master disk with grooves; and (ii) a method of providing two beam spots used to expose a photoresist layer coated on the master disk surface upon creating a master disk with grooves, and changing the relative move amount between these two beam spots, (iii) a method of changing the wobble amplitude width in the groove area 502, as shown in FIG. 28 is available.

Since an indefinite bit area 710 in the groove area 502 has a straight wall surface, no wobble detection signal is obtained. However, since one wall is wobbled at each of positions ϵ and η of neighboring land areas 503 and 507, a wobble signal can be obtained. Compared to the methods (i) and (ii), since the groove width variation in the indefinite bit area is small, a reproduction signal from recording marks recorded on it has a small level variation, and an effect of suppressing deterioration of error rate of rewritable information can be obtained. As a format method using this method, the same structure as that of the format shown in FIG. 12(*e*) or FIG. 26 can be adopted.

The embodiment that provides indefinite bits to grooves has been explained. As another embodiment of the present invention, a method that does not provide any indefinite bits to grooves at all, and reads track information on lands by utilizing the order of arrangement of track information is available.

A portion of the groove track information 606 in FIG. 12(*e*) is called track number information A 606 in FIG. 29, and that of the land track information 607 in FIG. 12(*e*) is called track number information B 607 in FIG. 29. The embodiment shown in FIG. 29 is characterized in that track numbers are set for track number information A 611 and track number information B 612 in a zigzag pattern in the groove area. In neighboring groove areas set with an identical track number, the same track number is set for a land area, and track information can be read even on the land without any indefinite bits. In neighboring groove areas set with different track numbers, a track number cannot be settled but it can be predicted by a method to be described later. The following features can be extracted from connection of information shown in FIG. 29.

1. On a groove, a smaller value of A and B matches a track number.

2. On a land, a track number of A is settled on an even track, and that of B is settled on an odd track.

3. On a land, a track number B is unsettled on an even track, and that of A is unsettled on an odd track (but the track number can be predicted by a method to be described later).

Furthermore, another example associated with the track information setting method will be described.

This method is a method that devises the Gray code setting method and allows address detection even when indefinite bits are present.

Conventionally, address information in an addressing method on land/groove recording tracks is formed by embossed prepits like a DVD-RAM. Also, a method of embedding address information by wobbling groove tracks has been proposed. However, a big problem is address formation of land tracks.

As one idea, groove and land addresses are separately allocated by groove wobbling. In this case, land addresses are formed by wobbling neighboring grooves that sandwich each land, and land addresses are implemented as if they were formed by wobbling.

However, this method requires a track address area of twice or more and is wasteful. If a set of address information can be used as both groove address information and land address information, efficient allocation can be made. As an implementation method of such allocation, a method of using the Gray codes as track address data may be used.

FIG. 30 shows the relationship between the track forms upon phase-modulating groove wobbles based on track address data, and a wobble detection signal on a land.

When address data is detected as a wobble signal on land n sandwiched between address data ". . . 100 . . . " of groove n and address data "... 110 ..." of groove n+1, it is "... 1x0 ...". Note that portion x is an area sandwiched between "0" of groove n and "1" of groove n+1, and a wobble detection signal is an amplitude zero signal at the center level. In an actual system, although the level becomes lower than other areas due to a track error amount of a read beam, unbalance of a detector, and the like, a signal on the data "1" or "0" side is more likely to be detected. By utilizing the fact that the detection level lowers in a land area sandwiched between different groove address data in this way, a land address signal may be detected by comparing that portion with the position of address data. However, this method is effective when the carrier-to-noise ratio of a wobble detection signal is high, but it cannot assure high reliability if noise is large.

Hence, as a method of reading out address data from a wobble detection signal on a land track, a method that can settle correct land address data even when different groove wobble data neighbor and land wobble detection data is indefinite (it can be determined as either "0" or "1") is demanded.

Hence, the present invention proposes a method that adopts the method of wobble-modulating groove track addresses using Gray code data, and a structure that can easily determine odd and even lands of land tracks by appending special codes or appending special identification codes by wobble modulation.

If an odd/even land track can be determined, it is easy to settle land address data due to the property of the Gray codes. The proof will be explained below using FIG. 31.

The Gray codes are designed so that a code change in one step is only 1 bit, as shown in FIG. 11. When addressing of groove tracks is made using these gray codes, only 1 bit of wobbles of each land formed by groove wobbles is detected as an indefinite code, as shown in FIG. 30. That is, when address data shown in FIG. 31 are allocated using groove tracks, only 1 bit of a wobble detection signal of a land track confronting the groove tracks is an indefinite bit (i.e., either "0" or "1"), and other bits are detected as the same values as those of neighboring groove wobble signal. As a wobble detection signal on even land n in FIG. 31, (n) or (n+1) is detected. Likewise, (n+1) or (n+2) is detected on odd land n+1.

If an odd or even land track is identified in advance, if (n+1) is detected in case of odd land n+1, that data is settled as an address value; if (n+2) is detected, (detection value −1) is settled as an address value. Likewise, in case of even land n, if (n) is detected, that value is settled as an address value; if (n+1) is detected, (detection value −1) is settled as an address value.

As described above, if an odd or even land track is determined, a correct address value can be easily settled even when the wobble detection value on the land track includes an indefinite bit. The wobble detection signal of a groove track is directly used as a track address.

FIG. 32 shows practical detection contents when 4-bit Gray codes are allocated as track addresses. If Gray code address data of groove track G(n) is "0110" and that of groove track G(n+1) is "1100", "1100" or "0100" is detected as a wobble signal of even land L(n). In this case, according to the ideal explained using FIG. 31, "0100" is settled as a correct address value since it is an even land.

However, even when the detection value described in FIG. 31 is not corrected by "0" or "−1", if land tracks always have odd/even identification, it is considered that each land track has two address values. Even when either "1100" or "0100" is detected from even land L(n) in FIG. 32, these codes are not present in other even lands. For this reason, it is possible to settle address data based on the detected value.

As odd/even identification of lands shown in FIGS. 31 and 32, a mark is inserted in a header field of a land using prepits.

In the groove wobble addressing method according to this embodiment, odd land/even land identification is important in address detection of lands, and various methods may be used as identification mark methods.

A track jump sequence will be explained below with reference to FIGS. 4 to 7.

For example, the access control circuit 18 receives the sum signal of two reflected light components detected by the photodetector 9. This sum signal includes a signal component corresponding to address information reflected on wobbles. That is, the access control circuit 18 can reproduce address information reflected on wobbles on the basis of this sum signal, and can consequently acquire address information of the current position traced by a beam spot. If the address information of the current position can be acquired, the circuit 18 can determine the track structure (land/groove track) of the current position. Furthermore, since the access control circuit 18 receives a seek command to the address of the target position from the system controller 25, it can determine the track structure (land/groove track) of the target position from the address of the target position. In this way, the access control circuit 18 determines the track structures of the current and target positions, and control access to the address of the target position by switching between a first servo polarity corresponding to a land track and a second servo polarity corresponding to a groove track at a predetermined timing as needed on the basis of the determination result of the two-track structures.

Figure 4:
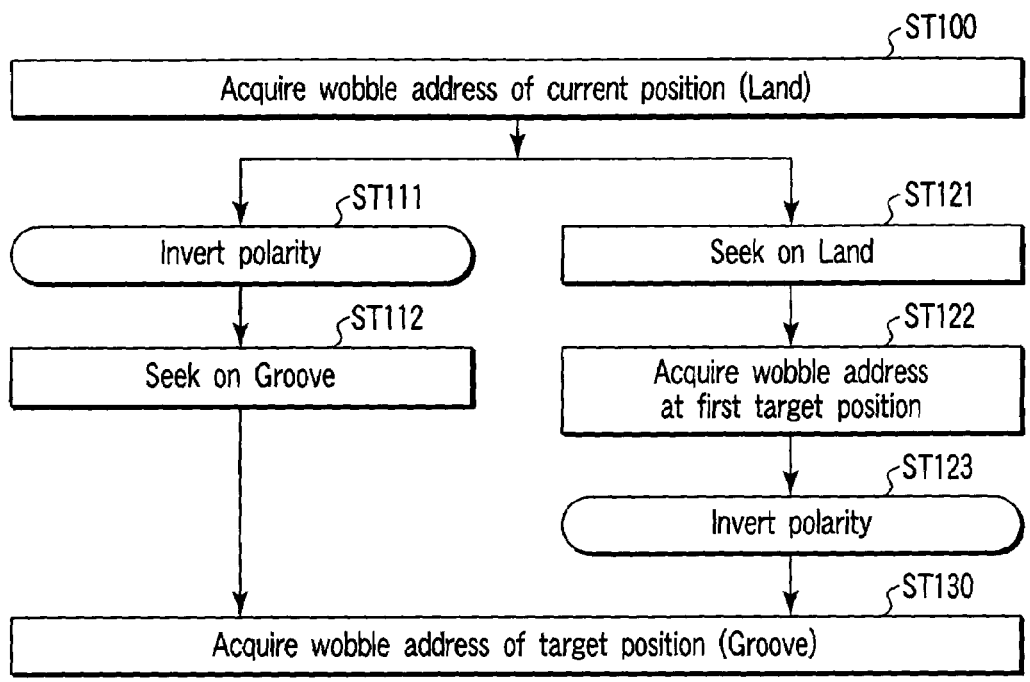
FIG. 4 is a flowchart showing an example of a track jump process when the current position is a land track and the target position is a groove track.

FIG. 4 is a flowchart showing an example of a track jump process when the current position is a land track and the target position is a groove track.

When the track structure of the current position is different from that of the target position, the servo polarity must be inverted. At the initial timing, i.e., when the land track is traced, the first servo polarity corresponding to the land track is applied (track servo=ON for the land track), and the servo polarity must be inverted at an arbitrary timing so as to access the groove track of the target position. That is, the first servo polarity corresponding to the land track must be switched to the second servo polarity corresponding to the groove track. At this time, there are two methods: a method of inverting the polarity before a seek operation and a method of inverting the polarity after a seek operation.

For example, if the servo polarity condition in a seek operation on an optical disk is not particularly limited (if a seek operation can be made by either the first servo polarity corresponding to a land track or the second servo polarity corresponding to a groove track), the access control circuit 18 acquires an address represented by wobbles of the track (land track) of the current position (ST100), and detects that the track structure (land track) of the current structure is different from that (groove track) of the target position. The circuit 18 then inverts the first servo polarity corresponding to the land track (ST111) to execute a seek operation by the second servo polarity corresponding to the groove track (ST112), thus acquiring an address represented by wobbles of the track (groove track) of the target position (ST130).

By contrast, if the servo polarity condition in a seek operation on the optical disk is limited, e.g., if only a seek operation using the first servo polarity corresponding to the land track is permitted, the access control circuit 18 acquires an address reflected on wobbles of the track (land track) of the current position (ST100), detects that the track structure (land track) of the current structure is different from that (groove track) of the target position, and executes a seek operation without changing the first servo polarity corresponding to the land track (ST121). At this time, since the circuit 18 cannot directly access the track (groove track) of the target position, it sets a track (land track) that neighbors the track (groove track) of the target position as a temporary target position, and makes access to this temporary target position. The circuit 18 then acquires an address represented by wobbles of the track of the temporary target position (ST122), inverts the first servo polarity corresponding to the land track (ST123), and acquires an address represented by wobbles from the track (groove track) of the target position using the second servo polarity corresponding to the groove track (ST130). Note that the track that neighbors the track of the target position can be a track that neighbors either the inner or outer periphery side of the track of the target position.

The acquisition timing of an address reflected on wobbles and the polarity inversion timing will be explained below. As described above, each address information is recorded using a Gray code, and a partial code included in this Gray code can settle address information. That is, the acquisition timing of an address reflected on wobbles is a timing at which a part of a period (modulation period) of the wobble address field 586 shown in, e.g., FIG. 12 is read and address information is settled. Accordingly, the polarity inversion (ST111) timing is a timing immediately after a part of the period (modulation period) of the wobble address field 586 is read and address information is settled. Alternatively, the timing at which the full period (modulation period) of the wobble address field 586 has been read often becomes an address acquisition timing. In this case, the polarity inversion (ST111) timing is a timing at which a beam spot traces the non-modulated field 591 that follows the wobble address field 586.

As described above, if the servo polarity condition in a seek operation on the optical disk is not particularly limited, the target position can be efficiently accessed without setting any temporary target position. If the servo polarity condition in a seek operation on the optical disk is limited, stable access according to that limitation can be made.

Figure 5:
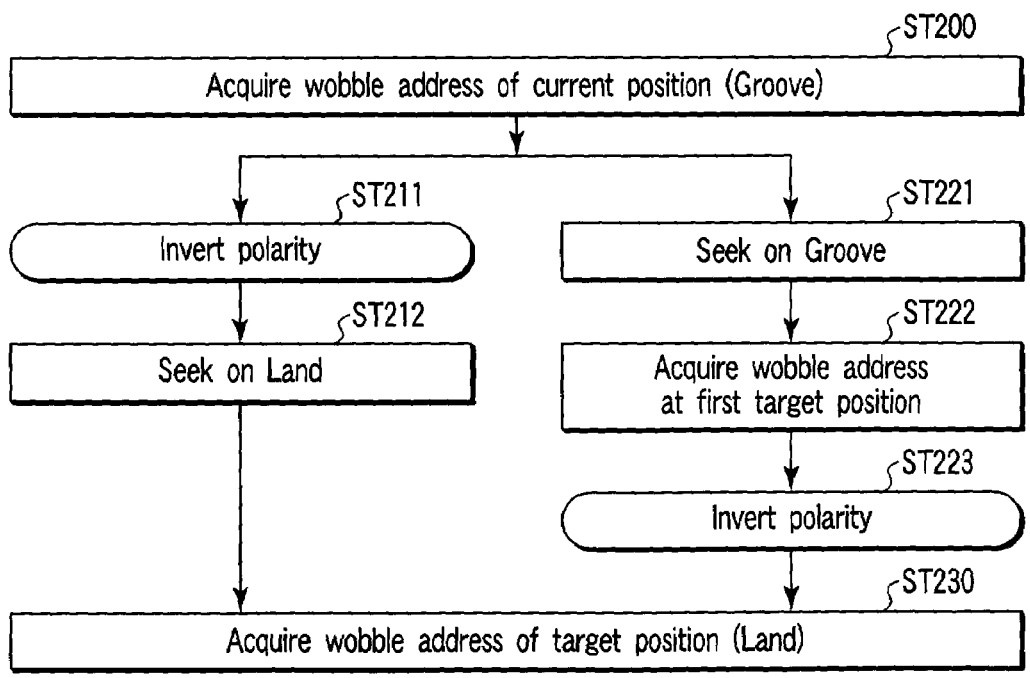
FIG. 5 is a flowchart showing an example of a track jump process when the current position is a groove track and the target position is a land track.

FIG. 5 is a flowchart showing an example of a track jump process when the current position is a groove track and the target position is a land track.

As described above, when the track structure of the current position is different from that of the target position, the servo polarity must be inverted. At the initial timing, i.e., when the groove track is traced, the second servo polarity corresponding to the groove track is applied (track servo=ON for the groove track), and the servo polarity must be inverted at an arbitrary timing so as to access the land track of the target position. That is, the second servo polarity corresponding to the groove track must be switched to the first servo polarity corresponding to the land track. At this time, there are two methods: a method of inverting the polarity before a seek operation and a method of inverting the polarity after a seek operation.

For example, if the servo polarity condition in a seek operation on an optical disk is not particularly limited (if a seek operation can be made by either the first servo polarity corresponding to a land track or the second servo polarity corresponding to a groove track), the access control circuit 18 acquires an address represented by wobbles of the track (land track) of the current position (ST200), and detects that the track structure (groove track) of the current structure is different from that (land track) of the target position. The circuit 18 then inverts the second servo polarity corresponding to the groove track (ST211) to execute a seek operation by the first servo polarity corresponding to the land track (ST212), thus acquiring an address represented by wobbles of the track (land track) of the target position (ST230).

In contrast, if the servo polarity condition in a seek operation on the optical disk is limited, e.g., if only a seek operation using the second servo polarity corresponding to the groove track is permitted, the access control circuit 18 acquires an address represented by wobbles of the track (groove track) of the current position (ST200), detects that the track structure (groove track) of the current structure is different from that (land track) of the target position, and executes a seek operation without changing the second servo polarity corresponding to the groove track (ST221). At this time, since the circuit 18 cannot directly access the track (land track) of the target position, it sets a track (groove track) that neighbors the track (land track) of the target position as a temporary target position, and makes access to this temporary target position. The circuit 18 then acquires an address represented by wobbles of the track of the temporary target position (ST222), inverts the second servo polarity corresponding to the groove track (ST223), and acquires an address represented by wobbles from the track (land track) of the target position using the first servo polarity corresponding to the land track (ST230). Note that the track that neighbors the track of the target position can be a track that neighbors either the inner or outer periphery side of the track of the target position.

The acquisition timing of an address represented by wobbles and the polarity inversion timing are as has been described above.

As described above, if the servo polarity condition in a seek operation on the optical disk is not particularly limited, the target position can be efficiently accessed without setting any temporary target position. If the servo polarity condition in a seek operation on the optical disk is limited, stable access according to that limitation can be made.

Figure 6:
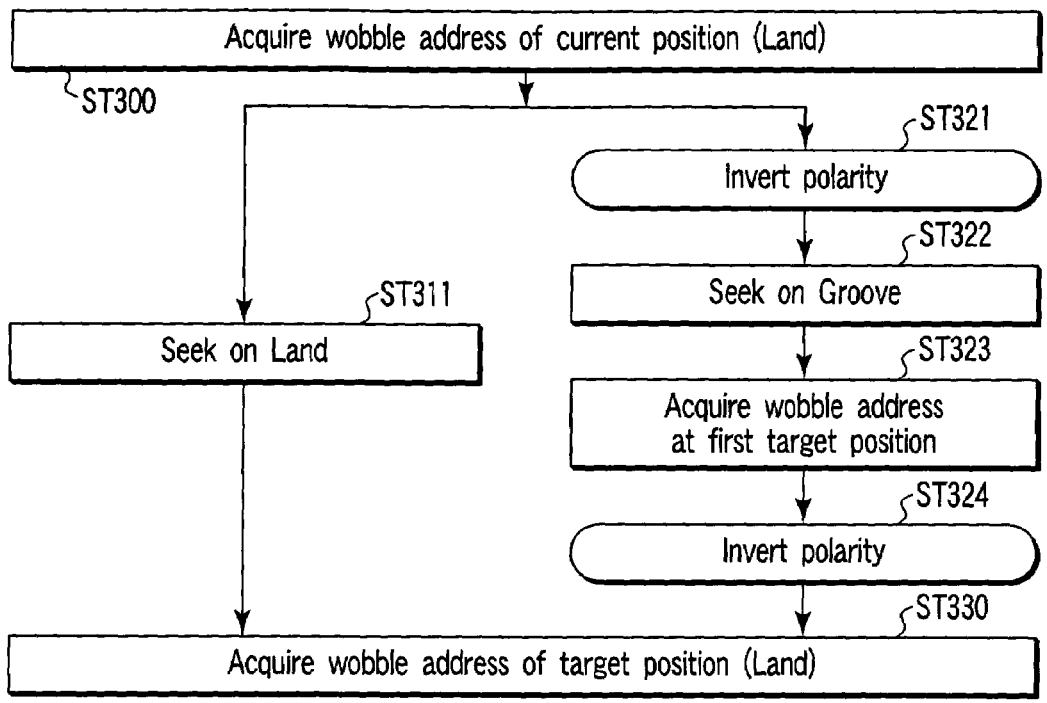
FIG. 6 is a flowchart showing an example of a track jump process when the current position is a land track and the target position is also a land track.

FIG. 6 is a flowchart showing an example of a track jump process when the current position is a land track and the target position is also a land track.

For example, if the servo polarity condition in a seek operation on an optical disk is not particularly limited (if a seek operation can be made by either the first servo polarity corresponding to a land track or the second servo polarity corresponding to a groove track), the access control circuit 18 acquires an address represented by wobbles of the track (land track) of the current position (ST300), and detects that the track structure (land track) of the current structure is the same as that (land track) of the target position. The circuit 18 then executes a seek operation by the first servo polarity corresponding to the land track (ST311), thus acquiring an address represented by wobbles of the track (land track) of the target position (ST330).

In contrast, if the servo polarity condition in a seek operation on the optical disk is limited, e.g., if only a seek operation using the second servo polarity corresponding to the groove track is permitted, the access control circuit 18 acquires an address represented by wobbles of the track (land track) of the current position (ST300), and detects that the track structure (land track) of the current structure is the same as that (land track) of the target position. The circuit 18 then inverts the first servo polarity corresponding to the land track (ST321) and executes a seek operation using the second servo polarity corresponding to the groove track (ST322). At this time, since the circuit 18 cannot directly access the track (land track) of the target position, it sets a track (groove track) that neighbors the track (land track) of the target position as a temporary target position, and makes access to this temporary target position. The circuit 18 then acquires an address represented by wobbles of the track of the temporary target position (ST323), inverts the second servo polarity corresponding to the groove track (ST324), and acquires an address represented by wobbles from the track (land track) of the target position using the first servo polarity corresponding to the land track (ST330). Note that the track that neighbors the track of the target position can be a track that neighbors either the inner or outer periphery side of the track of the target position.

The acquisition timing of an address represented by wobbles and the polarity inversion timing are as has been described above.

As described above, if the servo polarity condition in a seek operation on the optical disk is not particularly limited, the target position can be efficiently accessed without setting any temporary target position. If the servo polarity condition in a seek operation on the optical disk is limited, stable access according to that limitation can be made.

Figure 7:
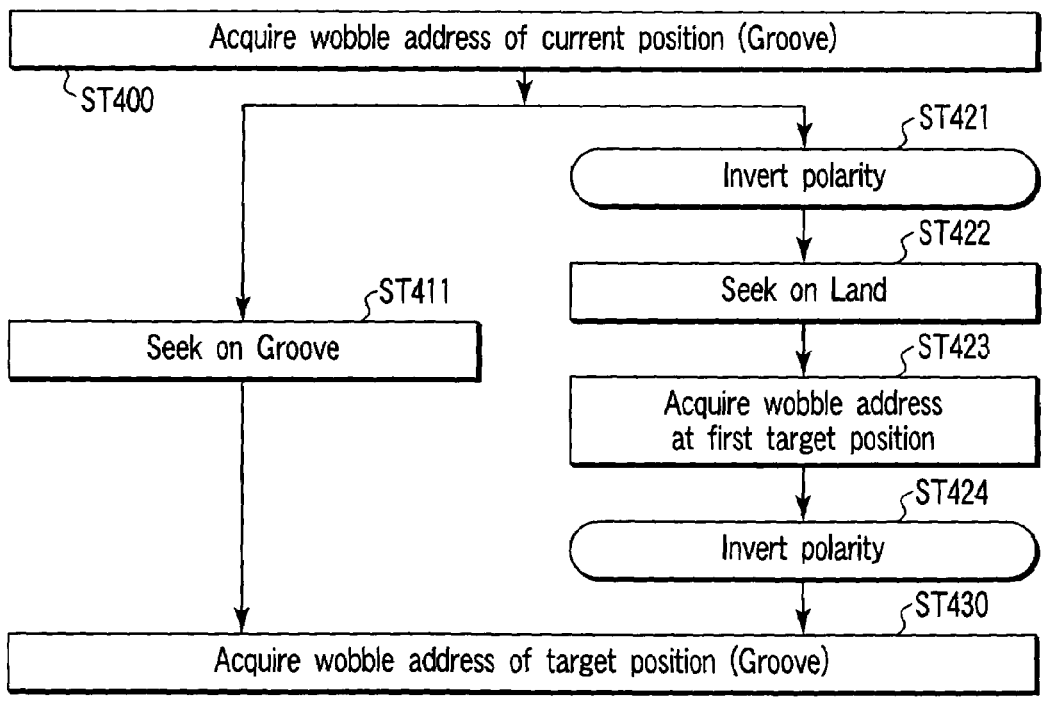
FIG. 7 is a flowchart showing an example of a track jump process when the current position is a groove track and the target position is also a groove track.

FIG. 7 is a flowchart showing an example of a track jump process when the current position is a groove track and the target position is also a groove track.

For example, if the servo polarity condition in a seek operation on an optical disk is not particularly limited (if a seek operation can be made by either the first servo polarity corresponding to a land track or the second servo polarity corresponding to a groove track), the access control circuit 18 acquires an address represented by wobbles of the track (groove track) of the current position (ST400), and detects that the track structure (groove track) of the current structure is the same as that (groove track) of the target position. The circuit 18 then executes a seek operation by the second servo polarity corresponding to the groove track (ST411), thus acquiring an address represented by wobbles of the track (groove track) of the target position (ST430).

In contrast, if the servo polarity condition in a seek operation on the optical disk is limited, e.g., if only a seek operation using the first servo polarity corresponding to the land track is permitted, the access control circuit 18 acquires an address represented by wobbles of the track (groove track) of the current position (ST400), and detects that the track structure (groove track) of the current structure is the same as that (groove track) of the target position. The circuit 18 then inverts the second servo polarity corresponding to the groove track (ST421) and executes a seek operation using the first servo polarity corresponding to the land track (ST422). At this time, since the circuit 18 cannot directly access the track (groove track) of the target position, it sets a track (land track) that neighbors the track (groove track) of the target position as a temporary target position, and makes access to this temporary target position. The circuit 18 then acquires an address represented by wobbles of the track of the temporary target position (ST423), inverts the first servo polarity corresponding to the land track (ST424), and acquires an address represented by wobbles from the track (groove track) of the target position using the second servo polarity corresponding to the groove track (ST430). Note that the track that neighbors the track of the target position can be a track that neighbors either the inner or outer periphery side of the track of the target position.

The acquisition timing of an address represented by wobbles and the polarity inversion timing are as has been described above.

As described above, if the servo polarity condition in a seek operation on the optical disk is not particularly limited, the target position can be efficiently accessed without setting any temporary target position. If the servo polarity condition in a seek operation on the optical disk is limited, stable access according to that limitation can be made.

Note that the track jump operation corresponds to an operation that jumps one track, an operation that jumps a plurality of tracks, and a so-called seek operation that continuously jumps across tracks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information reproduction method in which information from an information storage medium on which land and groove tracks which can record information are alternately formed in a radial direction along wobbles that represent address information, information reproduction method comprising:

determining a track structure of a current position traced by a light beam based on the address information imparted to reflected light obtained from the information storage medium, and a track structure of a target position based on a target position address included in a seek command;

controlling access to the address of the target position by switching between a first servo polarity corresponding to a land track and a second servo polarity corresponding to a groove track at a predetermined timing as needed based on a determination result of the two track structures; and reproducing predetermined information imparted to the reflected light obtained from an area corresponding to the address of the target position, wherein when a condition of the servo polarity in a seek operation on the information storage medium is limited to the first servo polarity, access to the address of the target position on a groove track is controlled by executing a seek operation by the first servo polarity corresponding to a land track of the current position to access a land track that neighbors the groove track of the target position on the basis of the determination result indicating that the track structure of the current position is a land track and the track structure of the target position is a groove track, acquiring address information imparted to wobbles along the land track, and switching the first servo polarity to the second servo polarity.

2. An information reproduction method which reproduces information from an information storage medium on which land and groove tracks which can record information are alternately formed in a radial direction along wobbles that represent address information, comprising:

determining a track structure of a current position traced by a light beam based on the address information imparted to reflected light obtained from the information storage medium, and a track structure of a target position on the basis of a target position address included in a seek command;

controlling access to the address of the target position by switching between a first servo polarity corresponding to a land track and a second servo polarity corresponding to a groove track at a predetermined timing as needed based on a determination result of the two track structures; and reproducing predetermined information imparted to the reflected light obtained from an area corresponding to the address of the target position, wherein when a condition of the servo polarity in a seek operation on the information storage medium is limited to the second servo polarity, access to the address of the target position on a land track is controlled by executing a seek operation by the second servo polarity corresponding to a groove track of the current position to access a groove track that neighbors the land track of the target position on the basis of the determination result indicating that the track structure of the current position is a groove track and the track structure of the target position is a land track, acquiring address information imparted to wobbles along the land track, and switching the second servo polarity to the first servo polarity.

3. An information reproduction method which reproduces information from an information storage medium on which land and groove tracks which can record information are alternately formed in a radial direction along wobbles that represent address information, comprising:

determining a track structure of a current position traced by a light beam based on the address information imparted to reflected light obtained from the information storage medium, and a track structure of a target position based on a target position address included in a seek command;

controlling access to the address of the target position by switching between a first servo polarity corresponding to a land track and a second servo polarity corresponding to a groove track at a predetermined timing as needed on the basis of a determination result of the two track structures; and reproducing predetermined information imparted to the reflected light obtained from an area corresponding to the address of the target position, wherein when a condition of the servo polarity in a seek operation on the information storage medium is limited to the first servo polarity, access to the address of the target position on a groove track is controlled by switching the second servo polarity corresponding to a groove track of the current position to the first servo polarity to execute a seek operation so as to access a land track that neighbors the groove track of the target position on the basis of the determination result indicating that the track structure of the current position is a groove track and the track structure of the target position is also a groove track, acquiring address information imparted to wobbles along the land track, and switching the first servo polarity to the second servo polarity.

4. An information reproduction method which reproduces information from an information storage medium on which land and groove tracks which can record information are alternately formed in a radial direction along wobbles that represent address information, comprising:

determining a track structure of a current position traced by a light beam based on the address information imparted to reflected light obtained from the information storage medium, and a track structure of a target position based on a target position address included in a seek command;

controlling access to the address of the target position by switching between a first servo polarity corresponding to a land track and a second servo polarity corresponding to a groove track at a predetermined timing as needed based on a determination result of the two track structures; and reproducing predetermined information imparted to the reflected light obtained from an area corresponding to the address of the target position, wherein when a condition of the servo polarity in a seek operation on the information storage medium is limited to the second servo polarity, access to the address of the target position on a land track is controlled by switching the first servo polarity corresponding to a land track of the current position to the second servo polarity to execute a seek operation so as to access a groove track that neighbors the land track of the target position on the basis of the determination result indicating that the track structure of the current position is a land track and the track structure of the target position is also a land track, acquiring address information imparted to wobbles along the groove track, and switching the second servo polarity to the first servo polarity.

5. An information recording method which records information on an information storage medium on which land and groove tracks which can record information are alternately formed in a radial direction along wobbles that represent address information, comprising:

determining a track structure of a current position traced by a light beam based on the address information imparted to reflected light obtained from the information storage medium, and a track structure of a target position based on a target position address included in a seek command;

controlling access to the address of the target position by switching between a first servo polarity corresponding to a land track and a second servo polarity corresponding to a groove track at a predetermined timing as needed based on a determination result of the two track structures; and recording predetermined information on an area corresponding to the address of the target position, wherein when a condition of the servo polarity in a seek operation on the information storage medium is limited to the first servo polarity, access to the address of the target position on a groove track is controlled by executing a seek operation by the first servo polarity corresponding to a land track of the current position to access a land track that neighbors the groove track of the target position on the basis of the determination result indicating that the track structure of the current position is a land track and the track structure of the target position is a groove track, acquiring address information imparted to wobbles along the land track, and switching the first servo polarity to the second servo polarity.

6. An information recording method which records information on an information storage medium on which land and groove tracks which can record information are alternately formed in a radial direction along wobbles that represent address information, comprising:

determining a track structure of a current position traced by a light beam based on the address information imparted to reflected light obtained from the information storage medium, and a track structure of a target position based on a target position address included in a seek command;

controlling access to the address of the target position by switching between a first servo polarity corresponding to a land track and a second servo polarity corresponding to a groove track at a predetermined timing as needed based on a determination result of the two track structures; and recording predetermined information on an area corresponding to the address of the target position, wherein when a condition of the servo polarity in a seek operation on the information storage medium is limited to the second servo polarity, access to the address of the target position on a land track is controlled by executing a seek operation by the second servo polarity corresponding to a groove track of the current position to access a groove track that neighbors the land track of the target position on the basis of the determination result indicating that the track structure of the current position is a groove track and the track structure of the target position is a land track, acquiring address information imparted to wobbles along the land track, and switching the second servo polarity to the first servo polarity.

7. An information recording method which records information on an information storage medium on which land and groove tracks which can record information are alternately formed in a radial direction along wobbles that represent address information, comprising:

determining a track structure of a current position traced by a light beam based on the address information imparted to reflected light obtained from the information storage medium, and a track structure of a target position based on a target position address included in a seek command;

controlling access to the address of the target position by switching between a first servo polarity corresponding to a land track and a second servo polarity corresponding to a groove track at a predetermined timing as needed based on a determination result of the two track structures; and recording predetermined information on an area corresponding to the address of the target position, wherein when a condition of the servo polarity in a seek operation on the information storage medium is limited to the first servo polarity, access to the address of the target position on a groove track is controlled by switching the second servo polarity corresponding to a groove track of the current position to the first servo polarity to execute a seek operation so as to access a land track that neighbors the groove track of the target position on the basis of the determination result indicating that the track structure of the current position is a groove track and the track structure of the target position is also a groove track, acquiring address information imparted to wobbles along the land track, and switching the first servo polarity to the second servo polarity.

8. An information recording method which records information on an information storage medium on which land and groove tracks which can record information are alternately formed in a radial direction along wobbles that represent address information, comprising:

determining a track structure of a current position traced by a light beam based on the address information imparted to reflected light obtained from the information storage medium, and a track structure of a target position based on a target position address included in a seek command;

controlling access to the address of the target position by switching between a first servo polarity corresponding to a land track and a second servo polarity corresponding to a groove track at a predetermined timing as needed based on a determination result of the two track structures; and recording predetermined information on an area corresponding to the address of the target position, wherein when a condition of the servo polarity in a seek operation on the information storage medium is limited to the second servo polarity, access to the address of the target position on a land track is controlled by switching the first servo polarity corresponding to a land track of the current position to the second servo polarity to execute a seek operation so as to access a groove track that neighbors the land track of the target position on the basis of the determination result indicating that the track structure of the current position is a land track and the track structure of the target position is also a land track, acquiring address information imparted to wobbles along the groove track, and switching the second servo polarity to the first servo polarity.

* * * * *